United States Patent [19]
Fujioka

[11] Patent Number: 5,403,075
[45] Date of Patent: Apr. 4, 1995

[54] ANTILOCK BRAKE CONTROL APPARATUS FOR CONTROLLING WHEEL CYLINDER PRESSURE AND REDUCING THE EFFECTS OF PRESSURE PULSATIONS

[75] Inventor: Hideaki Fujioka, Itami, Japan

[73] Assignee: Sumitomo Electric Industries, Ltd., Osaka, Japan

[21] Appl. No.: 992,769

[22] Filed: Dec. 18, 1992

[30] Foreign Application Priority Data

Dec. 20, 1991 [JP] Japan .................. 3-338400

[51] Int. Cl.$^6$ ............................................ B60T 8/58
[52] U.S. Cl. ................................ 303/100; 303/104; 303/DIG. 4
[58] Field of Search .......... 303/100, DIG. 3, DIG. 4, 303/103, 106, 107, 109, 116.1; 364/426.2

[56] References Cited

U.S. PATENT DOCUMENTS

| | | | |
|---|---|---|---|
| 4,585,280 | 4/1986 | Leiber | 303/DIG. 4 |
| 4,887,784 | 11/1989 | Leppek | 303/DIG. 4 |
| 4,900,099 | 2/1990 | Braschel | 303/DIG. 4 |
| 5,154,494 | 10/1992 | Kost et al. | 303/DIG. 4 |
| 5,207,484 | 5/1993 | Bleckman et al. | 303/DIG. 4 |

FOREIGN PATENT DOCUMENTS

| | | |
|---|---|---|
| 0308795 | 3/1989 | European Pat. Off. |
| 3942683 | 6/1990 | Germany . |
| 4021993 | 1/1991 | Germany . |
| 4020505 | 1/1992 | Germany . |
| 9008681 | 8/1990 | WIPO . |
| 9207741 | 5/1992 | WIPO ............ 303/DIG. 4 |

*Primary Examiner*—Matthew C. Graham
*Attorney, Agent, or Firm*—Sandler, Greenblum & Bernstein

[57] ABSTRACT

An antilock brake control apparatus is provided for adjusting the wheel cylinder pressure with actuators that include on/off-type valves. The antilock brake control apparatus includes wheel speed detectors for detecting the speed of each wheel, a wheel speed and estimated vehicle speed calculation device for calculating the wheel and vehicle behavior, and a locking symptoms detection device for detecting wheel locking symptoms and recovery from a wheel locking condition. A target pressure setting device for setting a target pressure, which is the estimated value of the wheel cylinder pressure during antilock brake control, based on a wheel cylinder pressure and a locking symptoms detection edge, is also provided. Further, a pressurization signal setting device for setting a pressurization signal used to drive the actuators based on the target pressure is provided. The antilock brake control apparatus reduces the effects of pressure pulsations caused by operation of the on/off valves and, thus, enables high precision wheel cylinder pressure control.

23 Claims, 19 Drawing Sheets

ANTILOCK BRAKE CONTROL APPARATUS FOR CONTROLLING WHEEL CYLINDER PRESSURE AND REDUCING THE EFFECTS OF PRESSURE PULSATIONS

BACKGROUND OF THE INVENTION

1. Field of the invention

The present invention relates to an antilock brake control apparatus, and more specifically to an antilock brake control apparatus that adjusts the wheel cylinder pressure by means of an actuator comprising an on/off valve. By applying open-loop control of the wheel cylinder pressure, the pulsating effects of the on/off-type valve can be reduced and the wheel cylinder pressure can thus be controlled with high precision.

2. Description of the prior art

In an antilock brake control apparatus according to the prior art, wheel skidding is detected from the acceleration and deceleration of the wheels and the relationship between the detected wheel speed and the estimated vehicle speed. The wheel cylinder pressure is then adjusted according to the skidding of the detected wheel to maintain wheel skidding to an appropriate level, i.e., within a limited range of the peak friction coefficient of the road surface. This control process makes it possible to shorten the total braking distance and maintain vehicle and steering stability.

Antilock brake control systems of this type generally use a solenoid valve or other valve as an on/off valve to regulate brake pressure. As a result, the de/pressurization characteristics of the wheel cylinder pressure relative to the operating (opening and closing) time of the on/off valve vary according to an exponential function because the increase/decrease characteristics of the wheel cylinder pressure depend upon the current wheel cylinder pressure and the pressure differential between the master cylinder pressure and the wheel cylinder pressure. It is therefore necessary to determine as precisely as possible the change in the wheel cylinder pressure in order to control the wheel cylinder pressure with high precision.

However, because of the high pressure pulses accompanying operation of the on/off valve, it is extremely difficult to control the wheel cylinder pressure with high precision insofar as the on/off valve control signal is output within a closed-loop process based on sequential comparison of the actual wheel cylinder pressure and the target wheel cylinder pressure. In other words, the wheel cylinder pressure may fluctuate along a high amplitude wave due to the pulses resulting from valve operation. As a result, the wheel cylinder pressure measured by the pressure detection means mounted on the wheel cylinder at any given point during antilock brake control may not accurately express the precise actual wheel cylinder pressure at that time. It is therefore difficult to precisely control wheel cylinder pressure and braking by sequential comparison of the target and supposed "actual" wheel cylinder pressures detected by such pressure detection means.

SUMMARY OF THE INVENTION

Therefore, an object of the present invention is to provide a cost effective antilock brake control apparatus for controlling the wheel cylinder pressure with high precision by applying the control signal to the on/off solenoid valve in an open-loop control process, or by reducing the reading frequency of the wheel cylinder pressure by the pressure detection means, without reading the pressure measurement of the pressure detection means.

To achieve this object, the antilock brake control apparatus according to the present invention adjusts the wheel cylinder pressure by means of a actuators equipped with on/off valves, and the antilock brake control apparatus further comprises a wheel speed detection means for detecting the speed of each wheel; a wheel and vehicle behavior calculation means for calculating the vehicle and wheel behavior, including at least the estimated vehicle speed, based on the speed of each wheel detected by the wheel speed detection means; a locking symptoms detection means for detecting wheel locking symptoms and recovery from wheel locking symptoms based on the wheel and vehicle behavior calculated by the wheel and vehicle behavior calculation means; a target pressure setting means for setting the target pressure, which is the estimated value of the wheel cylinder pressure during antilock brake control, based on the wheel cylinder pressure at the locking symptoms detection edge; and a pressurization signal setting means for setting the pressurization signal used to drive the actuator based on the target pressure.

More specifically, the target pressure setting means sets the pressurization command width, which is the magnitude of the increase or decrease in the wheel cylinder pressure, at each control cycle based on the wheel and vehicle behavior calculated by the wheel and vehicle behavior calculation means, calculates the integrated value of the pressurization command width, and defines the target pressure at each control cycle as the sum of the wheel cylinder pressure at the locking symptoms detection edge and the integrated value of the pressurization command width.

Furthermore, the pressurization signal setting means preferably sets the pressurization signal based on the target pressure and the pressurization command width.

It is further preferable for the antilock brake control apparatus to comprise a fluid pressure detection means for detecting the fluid pressure of each wheel cylinder, and for the target pressure setting means to define the wheel cylinder pressure at the locking symptoms detection edge as the pressure detected by the fluid pressure detection means.

Alternatively, the target pressure setting means may set the wheel cylinder pressure at the first locking symptoms detection edge to the equivalent pressure at which locking symptoms occur on a high friction coefficient road surface, and set the wheel cylinder pressure at the second and subsequent locking symptoms detection edges to the target pressure current at that time.

In this case, the target pressure setting means may adjust the wheel cylinder pressure at the first locking symptoms detection edge according to the time from the first locking symptoms detection edge until the wheel speed and vehicle speed are again synchronized, or according to the time from the first locking symptoms detection edge until a time when the pressure decrease detection is acquired.

Additionally in this case, the pressurization signal setting means sets the pressurization signal based on the wheel and vehicle behavior calculated by the wheel and vehicle behavior calculation means, and the target pressure setting means sets the pressurization command width from the pressurization signal set by the pressurization signal setting means, calculates the integrated value of the pressurization command widths, and sets the target pressure at each control cycle to the sum of the wheel cylinder pressure at the locking symptoms detection edge and the integrated value of the pressurization command widths for a predetermined time after the start of antilock brake control.

The predetermined time used here is defined as the time from the first locking symptoms detection edge until the wheel speed and vehicle speed are again synchronized, or the time from the first locking symptoms detection edge until a time when the pressure decrease detection is acquired.

In this case, the target pressure setting means detects a split road surface, which is defined as a road surface where the difference between the friction coefficients on right and left sides is great. When the vehicle is thus detected to be on a split road surface, the pressurization signal setting means sets the pressurization signal of the front wheel on the high friction coefficient side to a gradual increase level for the period from the locking symptoms detection edge until the wheel speed and estimated vehicle speed are again synchronized. The target pressure setting means also sets the pressurization command width from the pressurization signal set by the pressurization signal setting means, calculates the integrated value of the pressurization command widths, and defines the target pressure at each control cycle as the sum of the wheel cylinder pressure at the locking symptoms detection edge and the integrated value of the pressurization command width.

An antilock brake control apparatus according to the present invention as described above does not require a closed-loop process to control the actuator, and is not affected by fluid pressure pulsations caused by on/off valve operation while comparing the target and actual wheel cylinder pressures at each control cycle because of the target pressure setting means (which sets the target pressure (which is the estimated wheel cylinder pressure during antilock brake control) based on the wheel cylinder pressure at the locking symptoms detection edge) and the pressurization signal setting means (which sets the pressurization signal used to drive the actuator based on the target pressure).

In addition, the fluid pressure detection means, which is used to detect the wheel cylinder pressure, is not necessary when the wheel cylinder pressure at the first locking symptoms detection edge after antilock brake control starts is set to the pressure corresponding to the pressure when locking symptoms develop on a high friction coefficient road surface, and the wheel cylinder pressure at the second and subsequent locking symptoms detection edges is set to the target pressure current at that time.

In this case, the target pressure rapidly converges to the actual pressure when the wheel cylinder pressure at the first locking symptoms detection edge is adjusted according to the time from the first locking symptoms detection edge to the time when the wheel speed is again synchronized with the estimated vehicle speed, or according to the time from the first locking symptoms detection edge until a time when the pressure decrease detection is acquired.

Furthermore, when the pressurization signal is set according to the wheel and vehicle behavior during the period from the first locking symptoms detection edge after antilock brake control starts to the time when the wheel speed is again synchronized with the estimated vehicle speed (or from the first locking symptoms detection edge until a time when the pressure decrease detection is acquired), the target pressure rapidly converges to the actual pressure even when the difference between the actual pressure and the target pressure, (which is the pressure corresponding to the pressure when locking symptoms develop on a high friction coefficient road surface and is set as the wheel cylinder pressure at the first locking symptoms detection edge after antilock brake control starts) is great.

In addition, if the pressurization signal for the front wheel on the high friction coefficient side is set to a gradual increase level when the vehicle is detected to be on a split road surface, which is defined as a surface with a great difference between the road surface friction coefficients on right and left sides of the vehicle, sufficient braking control and driving stability can be maintained even on such split road surfaces.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of the present invention are described hereinbelow with reference to the accompanying figures.

Figure 1:
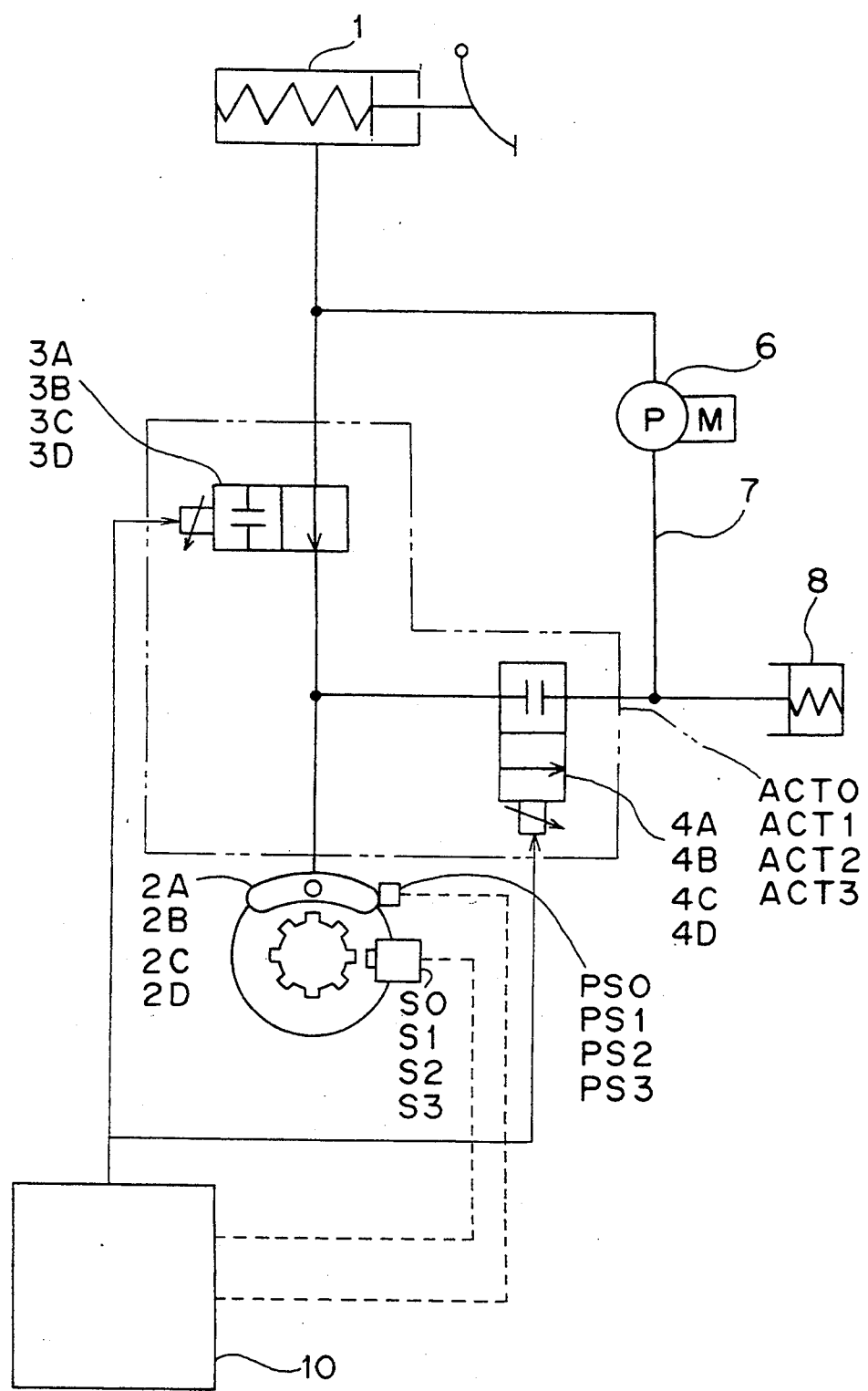
FIG. 1 is a block diagram of the connections and components of an antilock brake control apparatus according to the first embodiment of the invention.
Figure 2:
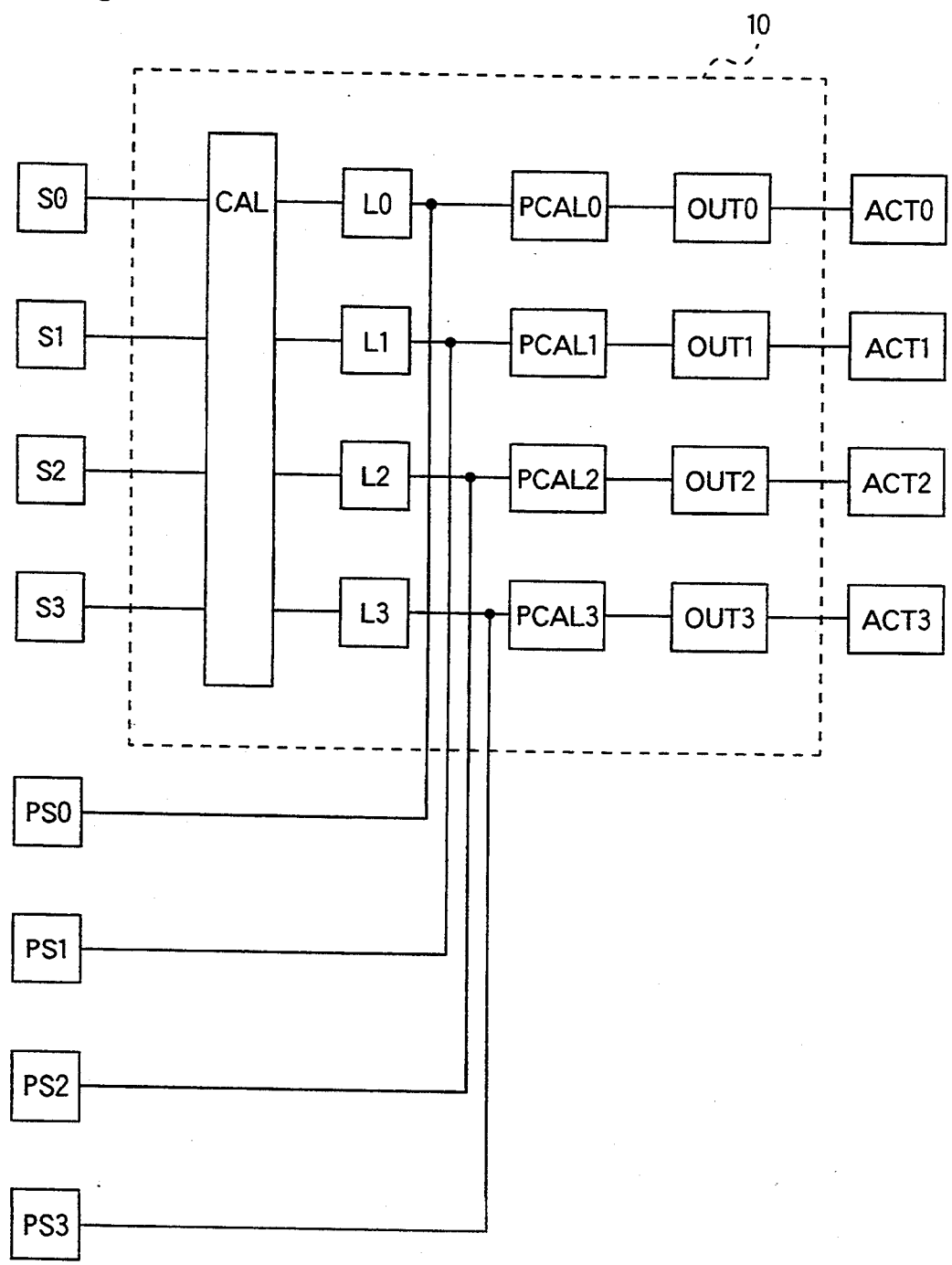
FIG. 2 is a block diagram of the signal processor in the first embodiment.

The antilock brake control apparatus according to the first embodiment of the invention as shown in FIGS. 1 and 2 is for use on a four wheel motor vehicle.

In this antilock brake control apparatus, an inlet valve 3A, 3B, 3C, 3D is positioned between each wheel cylinder 2A, 2B, 2C, 2D (at left and right front, and left and right rear wheels, respectively) and the master cylinder 1. Each of the inlet valves is an on/off-type solenoid valve. The brake fluid is returned from the wheel cylinders 2A-2D through the corresponding outlet valves 4A-4D (which are also on/off-type solenoid valves) and pump motor 6 to the master cylinder 1 via the return line 7. Note the buffer chamber 8 placed in the return line 7 between the outlet valves 4A-4D and the pump motor 6.

The wheel speed detection means $S_0$, $S_1$, $S_2$, $S_3$ detect the speed of the left and right front, and left and right rear wheels, respectively, and output the detected speed as the wheel speed signal to the signal processor 10, which is described below. The fluid pressure detection means $PS_0$, $PS_1$, $PS_2$, $PS_3$ detect the fluid pressure in each of the wheel cylinders 2A-2D, respectively, and output the detected fluid pressure as fluid pressure signals $PSNS_i$ (where i is the value 0, 1, 2, or 3 corresponding to and indicating the left and right front, and left and right rear wheels, respectively) to the signal processor 10.

The signal processor 10 is a microcomputer comprising, as shown in FIG. 2, the wheel and vehicle behavior calculation means CAL, locking symptoms detection means $L_0$, $L_1$, $L_2$, and $L_3$, target pressure setting means $PCAL_0$, $PCAL_1$, $PCAL_2$, and $PCAL_3$, and the pressurization signal setting means $OUT_0$, $OUT_1$, $OUT_2$, and $OUT_3$. The signal processor 10 processes the wheel speed signals and the fluid pressure signals $PSNS_i$ to output the pressurization signals $S_i$ to the actuators $ACT_0$, $ACT_1$, $ACT_2$, and $ACT_3$. The actuators $ACT_0$-$ACT_3$ are each equipped with one inlet valve 3A-3D and outlet valve 4A-4D.

The wheel and vehicle behavior calculation means CAL calculates the wheel speed $SPEED_i$ of each wheel as an expression of both wheel and vehicle behavior, the wheel acceleration $d/dt(SPEED_i)$, the second order derivative $d^2/dt^2(SPEED_i)$ of the wheel speed $SPEED_i$, and the estimated vehicle speed VREF according to methods of common knowledge based on the wheel speed signals input from the wheel speed detection means $S_0$-$S_3$.

The wheel and vehicle behavior calculation means CAL also compares the wheel speed $SPEED_i$ with the estimated vehicle speed VREF to determine a synchronization state when the wheel speed $SPEED_i$ is approximately equal to (synchronized with) the estimated vehicle speed VREF, and an asynchronization state when there is a significant difference between these compared values.

In this first embodiment of the invention, the synchronization state is specifically defined by equation [1] below.

$$VREF - SPEED_i \leq VREF/64 + 1 \qquad [1]$$

When equation [1] above is true, a synchronization state is determined to exist, and the synchronization flag $SYFLG_i$ is set to "0."

When the synchronization flag $SYFLG_i$ is "0" in the preceding control cycle, the locking symptoms detection means $L_0$-$L_3$ add "1" to the synchronization timer $SYTMR_i$. The synchronization timer $SYTMR_i$ is used to track how long the synchronization state continues. If, however, the synchronization flag $SYFLG_i$ is "1" in the preceding control cycle and equation [1] above is true in the current control cycle, the locking symptoms detection means $L_0$-$L_3$ clear the synchronization timer $SYTMR_i$. It is to be noted that the maximum value of the synchronization timer $SYTMR_i$ is 255.

When either equation [2] or [3] below is true, the locking symptoms detection means $L_0$-$L_3$ determine detection of locking symptoms.

$$VREF - SPEED_i \geq VREF/16 + 3$$

and $$d/dt(SPEED_i) \leq -1.5\,g \qquad [2]$$

where g is the acceleration of gravity; or $$VREF - SPEED_i \geq VREF/2 + 5$$

and $$d/dt(SPEED_i) \leq 0 \qquad [3]$$

In other words, when the difference between the wheel speed $SPEED_i$ and estimated vehicle speed VREF is not significantly great but the wheel deceleration $d/dt(SPEED_i)$ is high, or when wheel deceleration $d/dt(SPEED_i)$ is not significantly great but the difference between the wheel speed $SPEED_i$ and estimated vehicle speed VREF is great, the locking symptoms detection means $L_0$-$L_3$ return a "locking symptoms detected" result.

When the presence of locking symptoms is thus detected, the locking symptoms detection means $L_0$-$L_3$ set the control request $REQ_i$ to "decrease," and set the synchronization flag $SYFLG_i$ to "1." When locking symptoms are not detected, however, the control request $REQ_i$ is set to "increase" or "increase" depending on how long the synchronization state has continued.

When the locking symptoms detection means $L_0$-$L_3$ detect a shift from the synchronization state to a locking symptoms state, i.e., the locking symptoms detection edge, the fluid pressure signals $PSNS_i$ for the wheel cylinders 2A-2D detected by the fluid pressure detection means $PS_0$-$PS_3$ are read as the wheel cylinder pressure $PL_i$ at the locking symptoms detection edge.

The target pressure setting means $PCAL_0$-$PCAL_3$ sets the pressurization command width $DP_i$, which is the amount of increase/decrease of the wheel cylinder pressure at each control cycle, based on the wheel and vehicle behavior calculated by the wheel and vehicle behavior calculation means CAL at each control cycle, and sets the target pressure $PT_i$ (which is the estimated wheel cylinder pressure) based on the pressurization command width $DP_i$ and the wheel cylinder pressure $PL_i$ at the locking symptoms detection edge.

When the control request $REQ_i$ is "decrease," the target pressure setting means $PCAL_0$-$PCAL_3$ sets the pressurization command width $DP_i$ to "rapid decrease" if either equation [4] or [5] below is true. If neither equation is true, the pressurization command width $DP_i$ is set to "gradual decrease."

$$d^2/dt^2(SPEED_i) \leq -2\,g$$

and $$d/dt(SPEED_i) \leq 0 \qquad [4]$$

or $$d/dt(SPEED_i) \leq -6g$$

and $$d^2/dt^2(SPEED_i) \leq 0 \quad [5]$$

In other words, the target pressure setting means $PCAL_0$–$PCAL_3$ determine whether gradual or rapid decrease is appropriate based on the first and second order differentials of the wheel speed $SPEED_i$.

In addition, the target pressure setting means $PCAL_0$–$PCAL_3$ set the pressurization command width $DP_i$ to $DP_i = -10$ (bar) when the control request $REQ_i$ is "rapid decrease," but set the pressurization command width $DP_i$ by calculating equation [6] when the control request $REQ_i$ is "gradual decrease."

$$DP_i = d/dt(SPEED_i) + d^2/dt^2(SPEED_i) \quad [6]$$

When the control request $REQ_i$ is "increase," the target pressure setting means $PCAL_0$–$PCAL_3$ sets the pressurization command width $DP_i$ to "rapid increase" if equation [7] below is true. If equation [7] below is not true, the pressurization command width $DP_i$ is set to a "gradual increase" rate based on the synchronization timer $SYTMR_i$.

$$IDP_i < K_1 \cdot IDPMN_i$$

and $$SYFLG_i = 0 \quad [7]$$

where $IDP_i$ is the integrated value of the pressurization command width $DP_i$ from the locking symptoms detection edge, $IDPMN_i$ is the minimum integrated value $IDP_i$, and $K_1$ is a constant determined by the vehicle type and other conditions.

In the first embodiment of the invention, the target pressure setting means $PCAL_0$–$PCAL_3$ sets the pressurization command width $DP_i$ to $DP_i = 6$ (bar) when "rapid increase" is required. When "gradual increase" is required, the pressurization command width $DP_i$ is set to a "first gradual increase" by calculating equation [8] if a synchronization state exists. If a synchronization state does not exist, the pressurization command width $DP_i$ is set to a "second gradual increase" of $DP_i = 0.5$ (bar).

$$DP_i = 0.5 + SYTMR_i/128 \quad [8]$$

Figure 3:
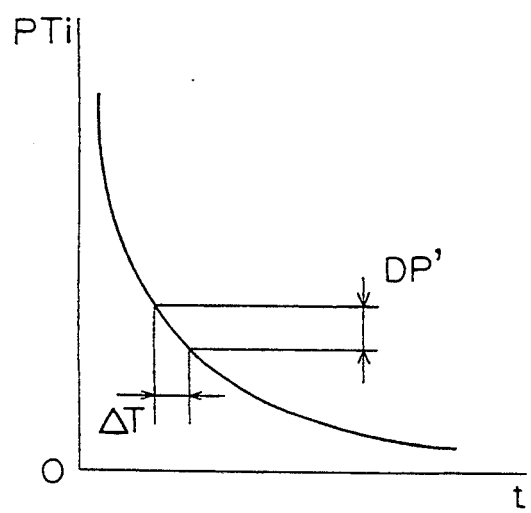
FIG. 3 is a graph of the pressure characteristics of an on/off valve.

The target pressure setting means $PCAL_0$–$PCAL_3$ also provide a minimum pressurization command width $DP_i$ for when the control request $REQ_i$ is "decrease," and resets the pressurization command width $DP_i$ to this minimum value when the above operation would otherwise set the pressurization command width $DP_i$ below the minimum. This is because of the on/off solenoid valves used for the inlet valves 3A–3D and the outlet valves 4A–4D. Specifically, as shown in FIG. 3, the relationship between the target pressure $PT_i$ and the valve operating time t is defined by an exponential function, and when decrease in any given target pressure $PT_i$ is completed during control cycle time $\Delta T$, decrease width greater than the pressure drop $DP'$ during this control cycle time $\Delta T$ is not possible.

More specifically, if the equation $$DP_i < K_2 \cdot (-PT) \quad [9]$$

is true when the pressurization command width $DP_i$ is a decrease signal in this first embodiment, then the pressurization command width $DP_i$ is set to $$DP_i = K_2 \cdot (-PT) \quad [10]$$

where $K_2$ is a constant value determined by the characteristics of the brake system.

The target pressure setting means $PCAL_0$–$PCAL_3$ also calculate the integrated value of the pressurization command width $DP_i$ from the locking symptoms detection edge, specifically the integrated value $IDP_i$ defined by equation [11], and the minimum $IDPMN_i$ integrated value $IDP_i$ each control cycle.

$$IDP_i = \int DP_i \quad [11]$$

When $IDP_i < -PL$, $IDP_i$ is forcibly set to $-PL$.

The target pressure setting means $PCAL_0$–$PCAL_3$ also calculate the target pressure $PT_i$, which is the estimated wheel cylinder pressure, each control cycle using equation [12].

$$PT_i = PL_i + IDP_i \quad [12]$$

where $PL_i$ is the wheel cylinder pressure at the locking symptoms detection edge as described above, and the target pressure $PT_i$ is the sum of the wheel cylinder pressure $PL_i$ at the locking symptoms detection edge and the integrated value $IDP_i$ of the pressurization command width $DP_i$.

In the first embodiment of the invention, the fluid pressure signals $PSNS_i$, which represent the actual wheel cylinder pressure detected by the fluid pressure detection means $PS_0$–$PS_3$, are defined as the wheel cylinder pressure $PL_i$ values.

The pressurization signal setting means $OUT_0$–$OUT_3$ set the pressurization signal $S_i$ according to the control request $REQ_i$.

When the control request $REQ_i$ is "decrease," the pressurization signal setting means $OUT_0$–$OUT_3$ sets the dump time $t_{dump}$, which is the time during which the outlet valves 4A–4D of the actuators $ACT_0$–$ACT_3$ are open and the inlet valves 3A–3D are closed, according to equation [13].

$$t_{dump} = -DP_i \cdot L/PT_i \quad [13]$$

Figure 4:
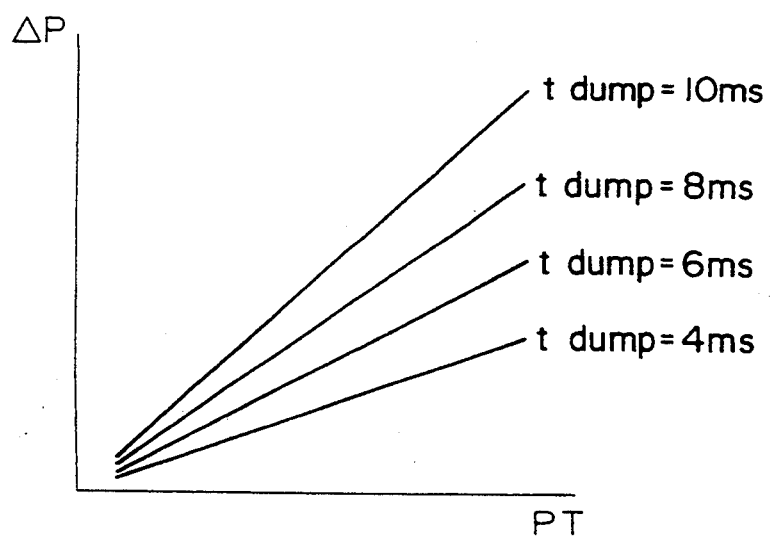
FIG. 4 is a graph of the relationship between the wheel cylinder pressure and depressurization width to depressurization time.

The dump time $t_{dump}$ is set by equation [13] using the relationship shown in FIG. 4, i.e., if the relationship between the decrease width $\Delta P$ and the target pressure $PT$ for a given dump time $t_{dump}$ is obtained, the decrease width $\Delta P$ is proportional to the target pressure $PT_i$ for each dump time $t_{dump}$.

The hold time $t_{hold}$ for holding the outlet valves 4A–4D and inlet valves 3A–3D of the actuators $ACT_0$–$ACT_3$ closed when the control request $REQ_i$ is "decrease" is obtained from equation [14].

$$t_{hold} = \Delta T - t_{dump} \quad [14]$$

The apply time $t_{apply}$ for opening the inlet valves 3A–3D and closing the outlet valves 4A–4D of the actuators $ACT_0$–$ACT_3$ when the control request $REQ_i$ is "increase" is set equivalent to the control cycle time ΔT, and the hold time $t_{hold}$ is obtained from equation [15].

$$t_{hold} = \Delta T \cdot (\Delta P / DP_i - 1) \quad [15]$$

In other words, when the wheel cylinder pressure is to be decreased, pressure increase is maintained for a period equivalent to the control cycle time ΔT at every nth control cycle in this first embodiment.

Also in the first embodiment, the pressurization command width $DP_i$ is set to 127 (bar), the pressurization signal $S_i$ sets the hold time $t_{hold}$ to 0, and the apply time $t_{apply}$ to the maximum value (255) of the synchronization timer $SYTMR_i$ when the control request $REQ_i$ is "end increase."

Thus, the pressurization signal setting means $OUT_0$–$OUT_3$ set the pressurization signal $S_i$ based on the target pressure $PT_i$ and the pressurization command width $DP_i$, and the pressurization signal $S_i$ is expressed as a function of the target pressure $PT_i$ and the pressurization command width $DP_i$ as shown by equation [16] below.

$$S_i = S_i(PT_i, DP_i) \quad [16]$$

The pressurization signal $S_i$ whereby the apply time $t_{apply}$, dump time $t_{dump}$, and hold time $t_{hold}$ are determined, is output to the actuators $ACT_0$–$ACT_3$. In a increase state, the inlet valves 3A–3D are opened and closed according to the pressurize time $t_{apply}$ and hold time $t_{hold}$, and the outlet valves 4A–4D are closed. In a decrease state, the outlet valves 4A–4D are opened and closed according to the dump time $t_{dump}$ and hold time $t_{hold}$, and the inlet valves 3A–3D are closed.

In this first embodiment, the actual wheel cylinder pressure detected by the fluid pressure detection means $PS_0$–$PS_3$ is read and set as the target pressure $PT_i$ at each control cycle only at the locking symptoms detection edge, the pressurization signal is output to the actuators $ACT_0$–$ACT_3$ in an open-loop control so the actual wheel cylinder pressure (actual pressure) tracks the target pressure $PT_i$, and the brake pressure at each of the wheel cylinders 2A–2D is thus controlled.

The operation of the signal processor 10 is described next with reference to the flow charts in FIGS. 5–9.

The first steps (steps #1, #2, and #3 in FIG. 5) are to calculate each wheel speed $SPEED_i$ by processing the wheel speed signals from each of the four wheel speed detection means $S_0$–$S_3$ (step #1), calculate the estimated vehicle speed VREF (step #2), and read the fluid pressure signals $PSNS_i$ from the fluid pressure detection means $PS_0$–$PS_3$.

Whether a synchronization state exists is then evaluated, and any wheel locking symptoms or recovery therefrom are detected (step #4). These processes are described in detail in FIGS. 6 and 7.

The synchronization flag $SYFLG_i$ in the preceding control cycle is read first (step #11). If the synchronization flag $SYFLG_i$ is "0" (i.e., a synchronization state existed during the preceding control cycle), the synchronization timer $SYTMR_i$ is incremented by one at the next step (#12). If, however, the synchronization flag $SYFLG_i$ is "1" (i.e., a synchronization state did not exist during the preceding control cycle), equation [1] is evaluated at step #13 to determine whether a synchronization state now exists. If a synchronization state is determined to now exist in step #13, the synchronization flag $SYFLG_i$ and synchronization timer $SYTMR_i$ are cleared in steps #14 and #15, respectively.

At the first step (step #16, FIG. 7) in the locking symptoms detection process, the presence of any locking symptoms is evaluated based on equations [2] and [3]. If locking symptoms are detected, the control request $REQ_i$ is set to "decrease" in step #17.

The synchronization flag $SYFLG_i$ is then checked at step #18. If at step #18 the synchronization flag $SYFLG_i$ is "0," then the locking symptoms detection edge is detected because a synchronization state existed until the preceding control cycle and locking symptoms have been detected in the current control cycle. As a result, the fluid pressure signal $PSNS_i$ read in step #3 is defined as the wheel cylinder pressure $PL_i$ in step #19, and the integrated value $IDP_i$ of the pressurization command width $DP_i$ and the minimum integrated value $IDPMN_i$ are both cleared at step #20. The synchronization flag $SYFLG_i$ is then set to "1" at step #21.

If at step #18 the synchronization flag $SYFLG_i$ is "1," locking symptoms have not been first detected in this control cycle (it is not a locking symptoms detection edge), and the process skips directly to step #21.

If at step #16 locking symptoms are not detected, the duration of the current synchronization state is checked in step #22, and the control request $REQ_i$ is set accordingly. Specifically, if the synchronization flag $SYFLG_i$ is "0" and the synchronization timer $SYTMR_i$ is $\geq 128$, the synchronization state is determined to have continued long enough for the control request $REQ_i$ to be set to the "end increase" at step #23. If the conditions of step #22 are not satisfied, however, the control request $REQ_i$ is set to "increase" at step #24.

Figure 8:
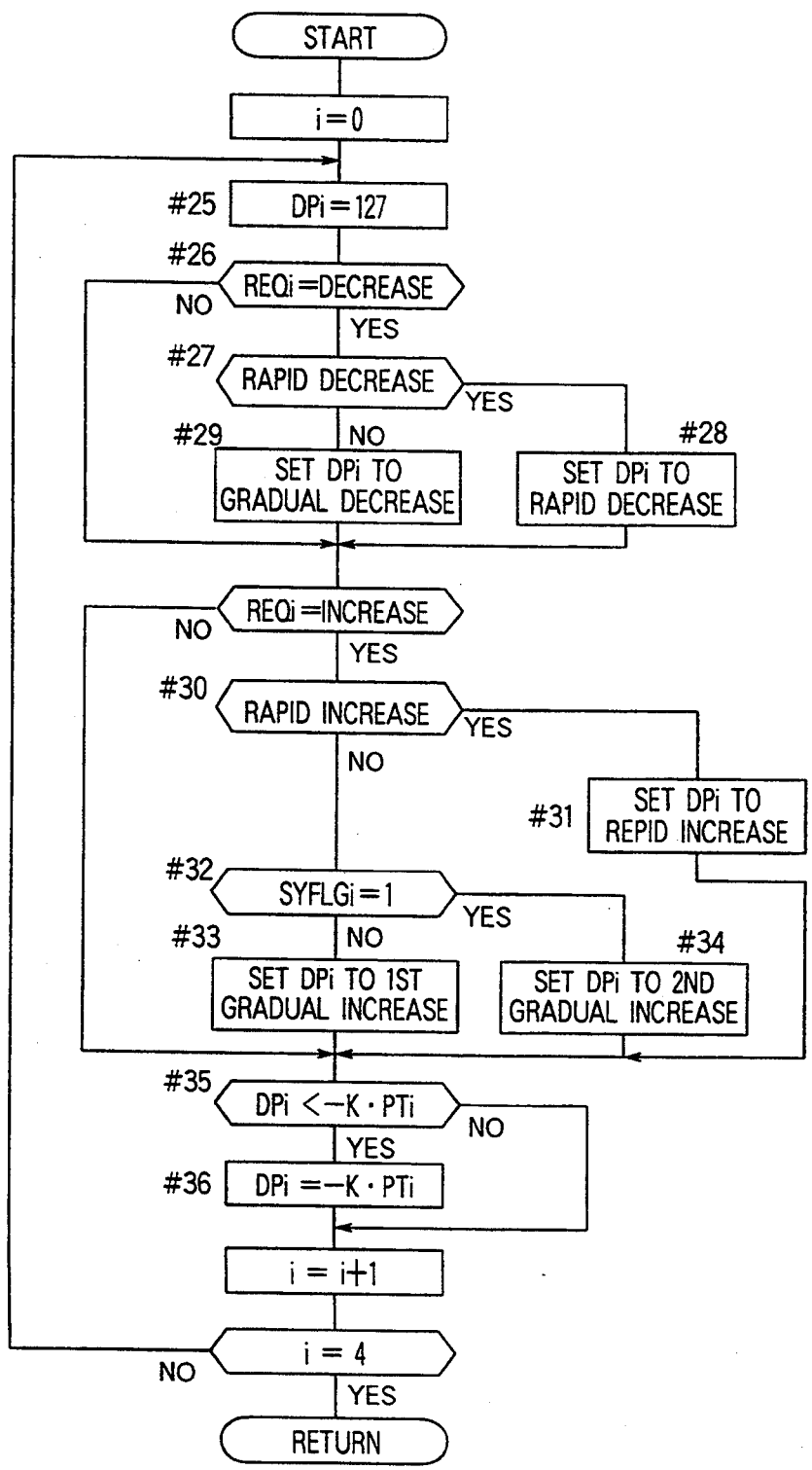
FIG. 8 is a flow chart of step #5 in FIG. 5.

Returning to FIG. 5, the pressurization command width $DP_i$ is then set at step #5. The procedure used to set the pressurization command width $DP_i$ in step #5 is shown in FIG. 8.

The pressurization command width $DP_i$ is initialized to 127 (bar) at step #25 (FIG. 8) corresponding to the "end increase" control request $REQ_i$. The pressurization command width $DP_i$ is then set according to the control request $REQ_i$.

Specifically, if the control request $REQ_i$ is "decrease," the conditions requiring a "rapid decrease" are evaluated at step #27 based on equations [4], [5], and [6]. If "rapid decrease" is required, the pressurization command width $DP_i$ is set to rapid decrease at step #28, otherwise the pressurization command width $DP_i$ is set to gradual decrease at step #29.

If the control request $REQ_i$ is increase and at step #30 the rapid increase conditions are not met, the synchronization flag $SYFLG_i$ is checked at step #32. If the synchronization flag $SYFLG_i$ is not "1" (i.e., a synchronization state exists), the pressurization command width $DP_i$ is set to the first gradual increase level based on equation [8] at step #33. If the synchronization flag $SYFLG_i$ is "1" because an asynchronization state exists, the pressurization command width $DP_i$ is set to the second gradual increase level at step #34.

The value of the set pressurization command width $DP_i$ is then checked at step #35 based on equation [9]. If step #35 is true, i.e., the pressurization command width $DP_i$ is less than the minimum threshold value, then the pressurization command width $DP_i$ is reset to $(-K \cdot PT)$ at step #36.

Returning again to FIG. 5, the integrated value $IDP_i$ of the pressurization command width $DP_i$ is next calculated using equation [11] at step #6, and the minimum integrated value $IDPMN_i$ is also obtained. The target pressure $PT_i$ is also calculated from equation [12] in step #6.

The pressurization signal $S_i$ is then set in step #7. This process is shown in FIG. 9.

Figure 9:
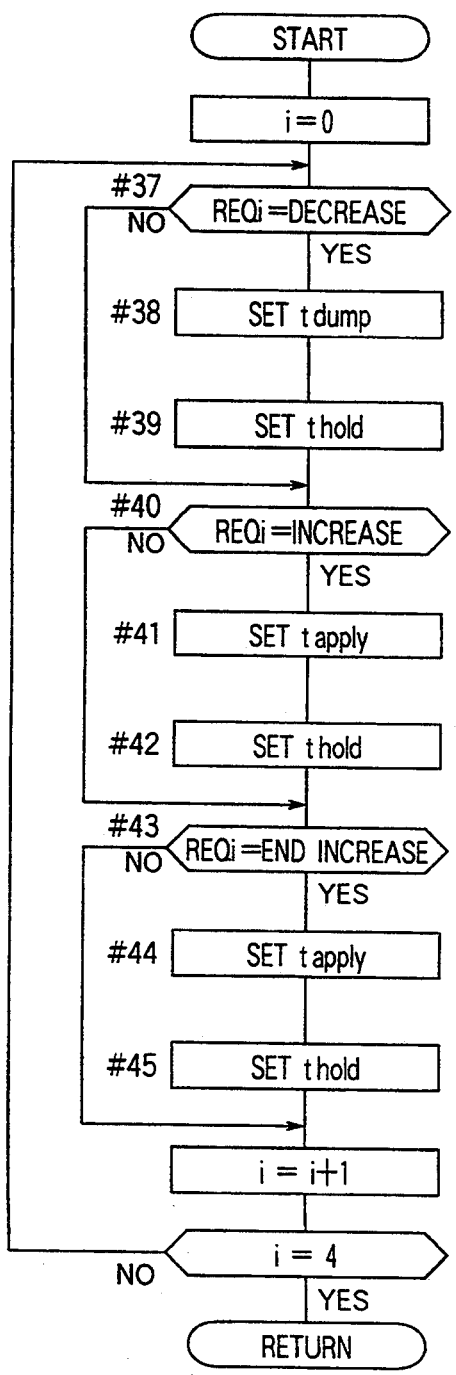
FIG. 9 is a flow chart of step #7 in FIG. 5.

The control request $REQ_i$ is polled at step #37 (FIG. 9). If the control request $REQ_i$ is "decrease," the dump time $t_{dump}$ is set by applying equation [13] and the hold time $t_{hold}$ is set by applying equation [14] in steps #38 and #39, respectively.

If, however, step #37 returns NO and the control request $REQ_i$ is "increase" (step #40 returns YES), the apply time $t_{apply}$ is set equal to the control cycle time $\Delta T$ (step #41) and the hold time $t_{hold}$ is set by applying equation [15] (step #42).

If both step #37 and step #40 return NO because the control request $REQ_i$ is "end increase" (step #43 returns YES), the apply time $t_{apply}$ is set equal to 255 (step #44) and the hold time $t_{hold}$ is set to "0" (step #45).

Figure 5:
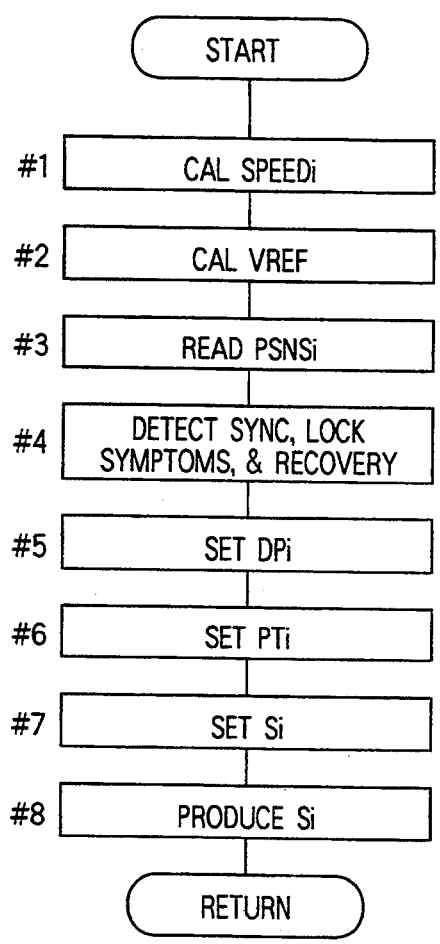
FIG. 5 is a flow chart of the operation of the first embodiment.

After thus setting the dump time $t_{dump}$, apply time $t_{apply}$, and hold time $t_{hold}$ of the pressurization signals $S_i$, the pressurization signals $S_i$ are output to the actuators $ACT_0$-$ACT_3$ (step #8, FIG. 5).

Figure 10:
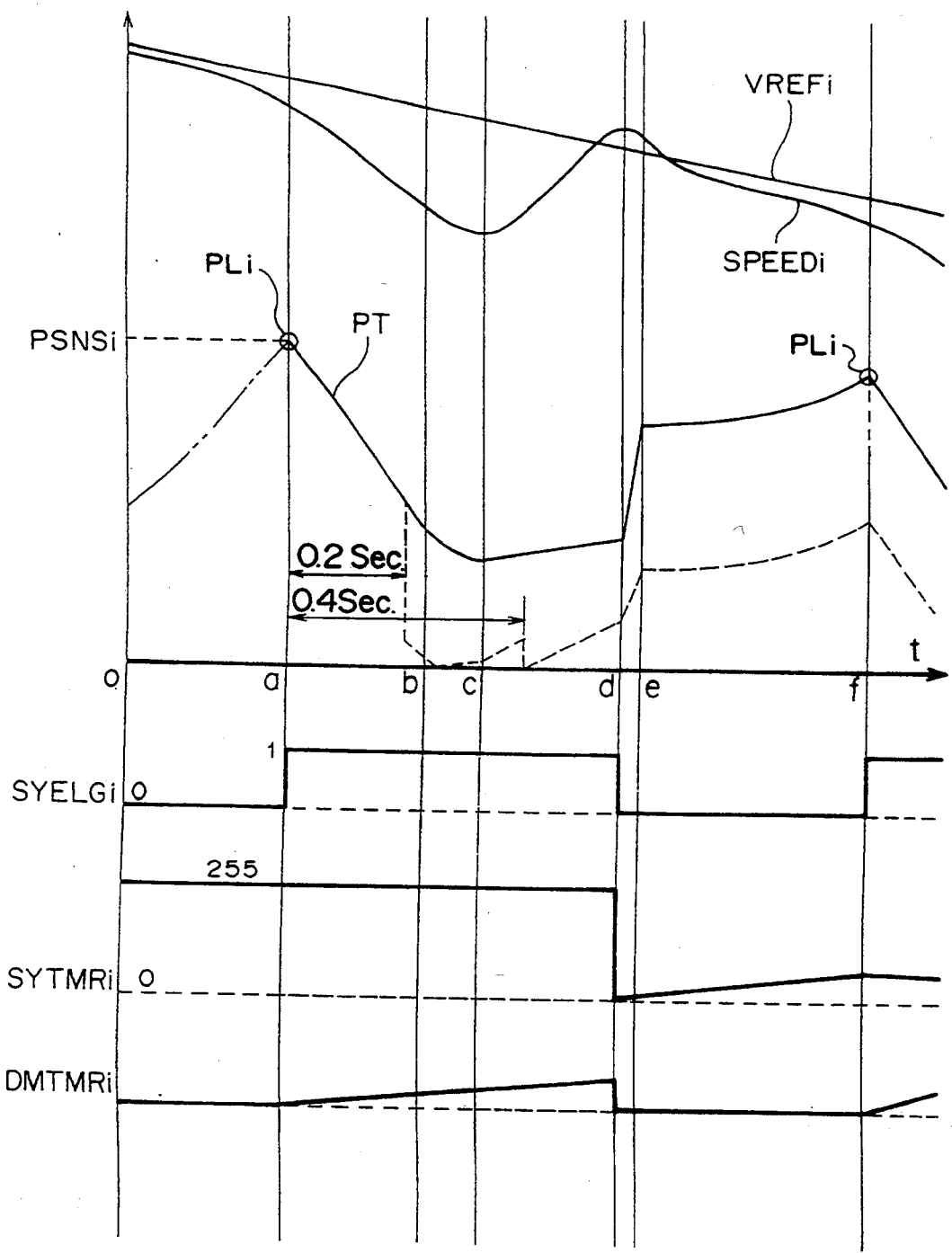
FIG. 10 is a graph of the control process according to the first embodiment of the invention.

A graph of the various signal values during actual antilock brake control operation of an antilock brake control apparatus according to the first embodiment is shown in FIG. 10.

Referring to FIG. 10, when time t is at a (t=a), corresponding to the first locking symptoms detection edge after the start of antilock brake control, the synchronization flag $SYFLG_i$ is set to "1," and the fluid pressure signals $PSNS_i$ from the pressure detection means $PS_i$ are read as the wheel cylinder pressure $PL_i$ values.

When t is between a and b (t=a−b), the control request $REQ_i$ is "decrease" and the pressurization command width $DP_i$ is set to "rapid decrease." The pressurization signals $S_i$ are thus set by applying equations [13] and [14] according to the pressurization command width $DP_i$ and the target pressure $PT_i$.

When t is between b and c (t=b−c), the control request $REQ_i$ is "decrease" and the pressurization command width $DP_i$ is set to "gradual decrease." The pressurization signals $S_i$ are thus set by applying equations [13] and [14] according to the current pressurization command width $DP_i$ and the target pressure $PT_i$.

When t is between c and d (t=c−d), the control request $REQ_i$ is "increase" but a synchronization state does not exist. The pressurization command width $DP_i$ is therefore set to the "second gradual increase" value, and the pressurization signals $S_i$ are set by applying equation [15] according to the current pressurization command width $DP_i$ and the target pressure $PT_i$.

When time t is at d (t=d), a synchronization state is restored.

When t is between d and e (t=d−e), the pressurization command width $DP_i$ is therefore set to rapid increase, and the synchronization flag $SYFLG_i$ to 0.

When t is between e and f (t=e−f), the pressurization command width $DP_i$ is set to the first gradual pressurization value.

When t is at f (t=f), the locking symptoms detection edge is again detected. The fluid pressure signals $PSNS_i$ indicating the current wheel cylinder pressure output from the fluid pressure detection means $PS_0$-$PS_3$ are thus read as the wheel cylinder pressure $PL_i$ values, and the same control process is repeated.

As described above, the fluid pressure signals $PSNS_i$ are read as the wheel cylinder pressure $PL_i$ from the fluid pressure detection means $PS_0$-$PS_3$ only when locking symptoms are detected in this first embodiment, and the target pressure $PT_i$ is set based on these values. In other words, the frequency at which the pressure values output from the fluid pressure detection means $PS_0$-$PS_3$ are read is reduced to achieve an open-loop control process in this first embodiment of an antilock brake control apparatus. As a result, this antilock brake control apparatus is not affected by the pressure pulsations accompanying on/off solenoid valve operation, and the wheel cylinder pressure can be controlled as desired.

Figure 11:
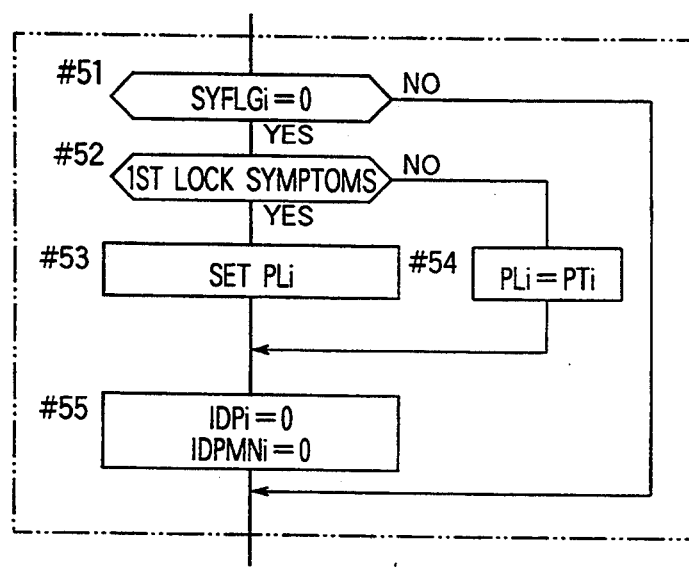
FIG. 11 is a flow chart used to describe the operation of the second embodiment.

FIG. 11 is a flow chart of the alternative control steps characterizing the second embodiment of the invention.

The connections and configuration of the second embodiment are identical to those of the first embodiment described above except for the elimination of the fluid pressure detection means $PS_0$-$PS_3$ shown in FIG. 1. As a result, the operation of this second embodiment is also similar to that of the first embodiment except for the elimination of step #3 in the FIG. 5 flow chart, and the substitution of the process shown in FIG. 11 for the steps indicated by the double-dot dash line (1) in FIG. 7.

When the locking symptoms detection means $L_0$-$L_3$ detect locking symptoms and the control request $REQ_i$ is set to "decrease" in this second embodiment, the synchronization flag $SYFLG_i$ is polled at step #51. If the synchronization flag $SYFLG_i$ is "1", i.e., an asynchronization state existed also during the preceding control cycle, control flows directly to step #21 in FIG. 7. If, however, the synchronization flag $SYFLG_i$ is "0" because of the locking symptoms detection edge, it is determined in step #52 whether this is the first locking symptoms detection edge. Specifically, if the synchronization timer $SYTMR_i$ test $$SYTMR_i \geq 128 \qquad [17]$$

is true, it is determined that the duration of the previous synchronization state continued for a sufficiently long period, and that the present locking symptoms detection edge is the first edge. The wheel cylinder pressure $PL_i$ is therefore set to the pressure corresponding to the locking symptoms start pressure on a high friction coefficient road surface (step #53). These values may be, for example, 100 (bar) for $PL_0$ and $PL_1$ (the left and right front wheels), and 60 (bar) for $PL_2$ and $PL_3$ (the left and right rear wheels).

However, if equation [17] is not true, the current locking symptoms detection edge is determined to not be the first in the current control operation, and the target pressure $PT_i$ of the preceding control cycle is set to the wheel cylinder pressure $PL_i$ (step #54).

If at step #51 a synchronization state is detected (NO is returned), the integrated value $IDP_i$ of the pressurization command width $DP_i$ and the minimum integrated value $IDPMN_i$ are both cleared (step #55).

In other words, the target pressure setting means $PCAL_0$-$PCAL_3$ in the second embodiment set the wheel cylinder pressure at the first locking symptoms detection edge after antilock brake control start to the pressure corresponding to the locking symptoms start pressure on a high friction coefficient road surface, but use the current target pressure $PT_i$ as the wheel cylinder pressure $PL_i$ at the second and subsequent locking symptoms detection edges.

Figure 12:
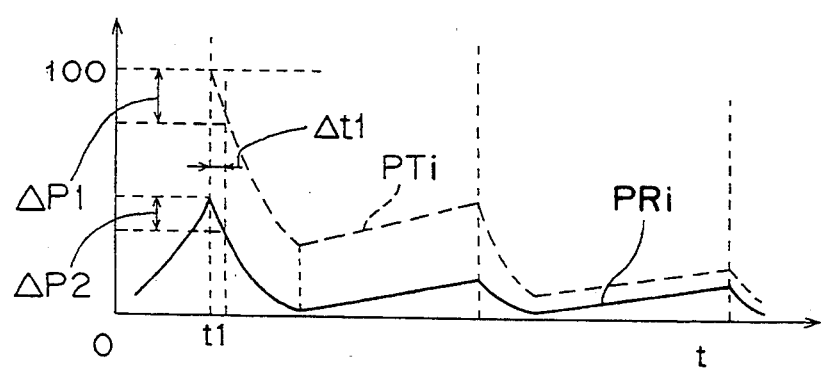
FIG. 12 is a graph of the relationship between the target pressure and real pressure in the second embodiment.

The relationship between the target pressure $PT_i$ and the actual wheel cylinder pressure (actual pressure) in this second embodiment is shown in FIG. 12. As shown in this graph, the wheel cylinder pressure can be controlled as desired because the target pressure $PT_i$ converges quickly with time on the actual pressure PRi.

The reasons for this rapid convergence between the target pressure $PT_i$ and the actual pressure PRi follow.

First, if the pressurization command width $DP_i$ is set to decrease width $\Delta P1$ at time t=t1 in FIG. 12, the dump time from the decrease characteristics of the target pressure $PT_i$ will be $\Delta t1$.

However, when the actual pressure PRi is less than the target pressure $PT_i$, the actual pressure PRi will only drop by $\Delta P2$, which is less than $\Delta P1$, even though the pressure drop continues for $\Delta t1$. The target pressure $PT_i$ thus effectively converges on the actual pressure PRi because the decrease amount of the actual pressure PRi is only deficient by an amount equal to the difference between the target pressure $PT_i$ and the actual pressure PRi.

Second, when the drop in the actual pressure PRi is less than the drop in the target pressure $PT_i$ as above, locking symptoms continue to be detected. As a result, the pressurization command width $DP_i$ is steadily increased (as absolute value) for even greater decrease, and the convergence is accelerated.

When the second embodiment comprises on/off solenoid valves as above, the pressure detection means can be eliminated while maintaining control because of the exponential function defining the decrease characteristics of the wheel cylinder pressure, and this elimination of parts reduces the cost of the system.

The third embodiment of the invention is described below with reference to FIG. 13. In this third embodiment, step #56 (FIG. 13 (A)) is inserted for part ② in FIG. 6, step #57 (FIG. 13 (B)) is inserted for part ③ in FIG. 6, and steps #58–#64 (FIG. 13 (C)) are inserted for part ④ in FIG. 7.

In this third embodiment the signal processor 10 further comprises asynchronization timers $DMPTMR_i$ to correct the wheel cylinder pressure $PL_i$ for each of the left and right front wheels P0 and P1 at the locking symptoms detection edge according to the time from the first locking symptoms detection edge after the start of antilock brake control for that wheel until the wheel speed $SPEED_i$ and vehicle speed VREF are again synchronized. Thus, when the asynchronization time is long during initial skidding by one of the front wheels, the friction coefficient of the road surface corresponding to the skidding wheel is determined to be low, resulting in an adjustment of that front wheel and the wheel cylinder pressure on the same side.

Figure 6:
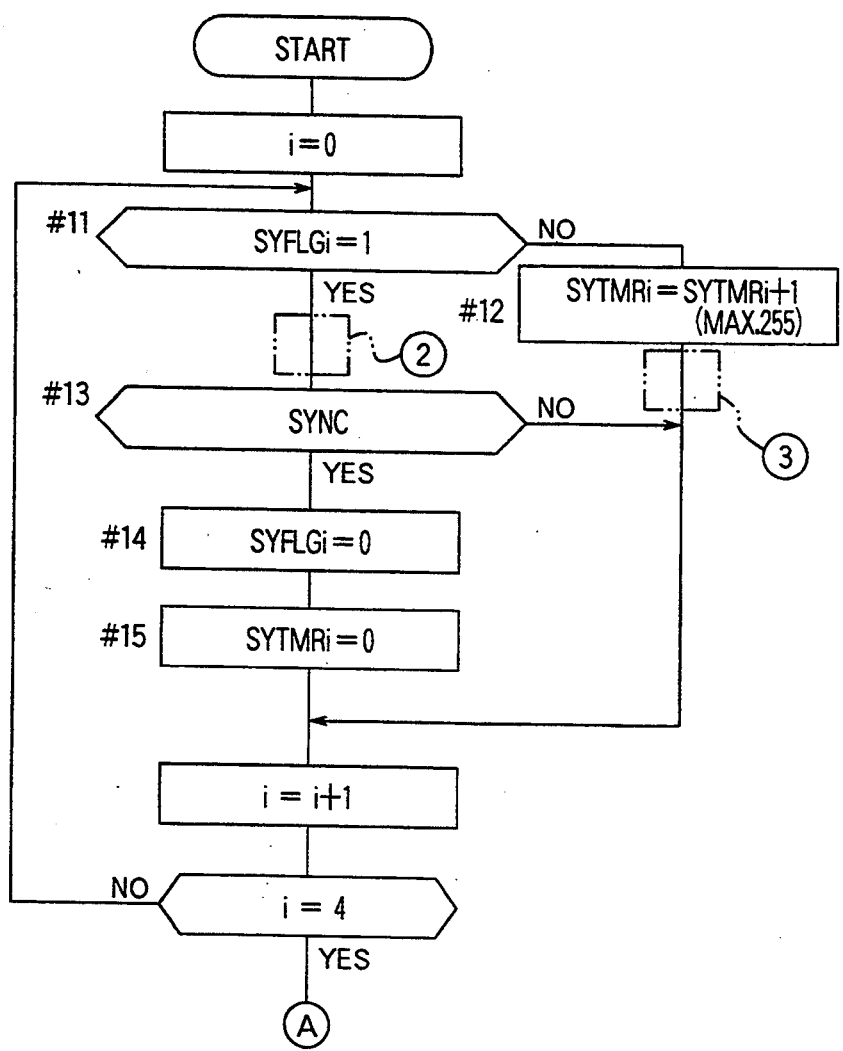
FIG. 6 is a flow chart of step #4 in FIG. 5.
Figure 7:
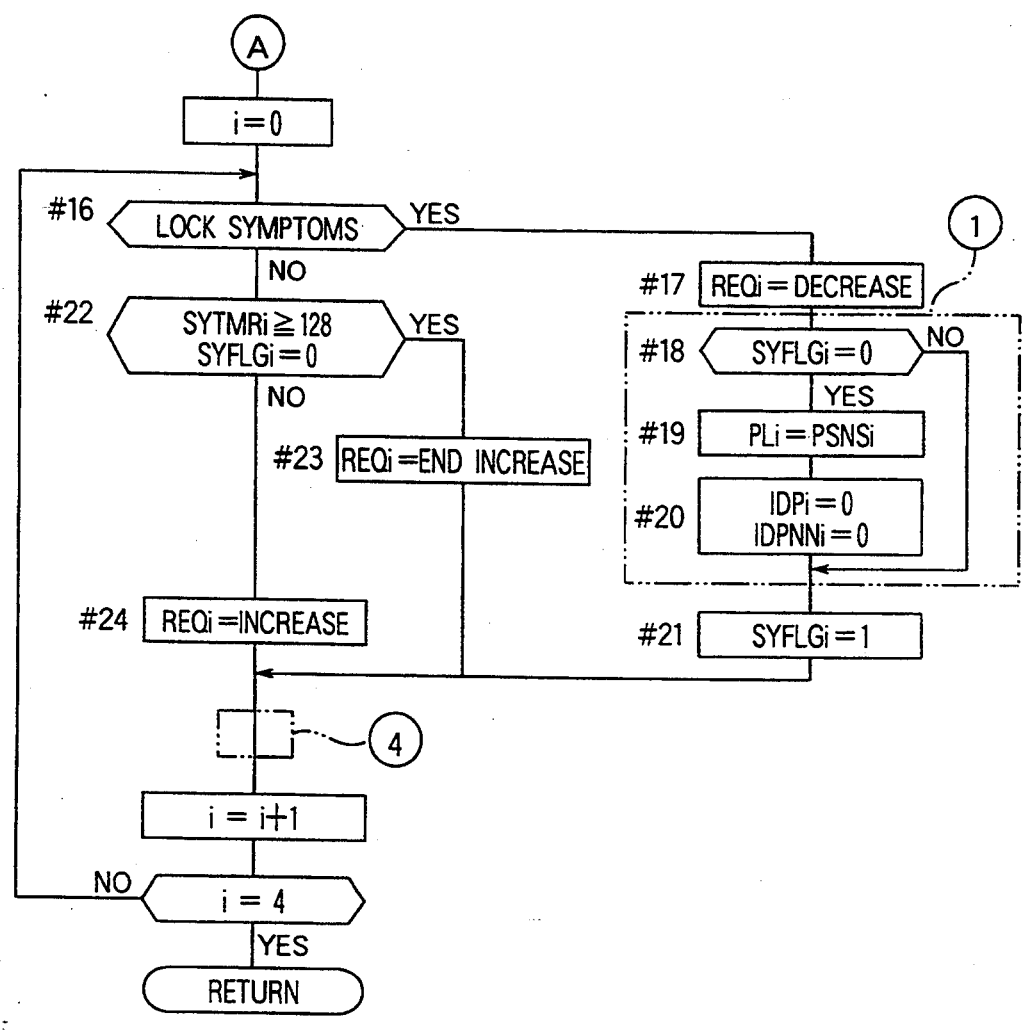
FIG. 7 is a flow chart of step #4 in FIG. 5.
Figure 13A:
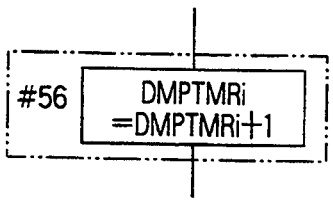
FIG. 13(A), 13(B), and 13(C) are flow charts used to describe the operation of the third embodiment.
Figure 13B:
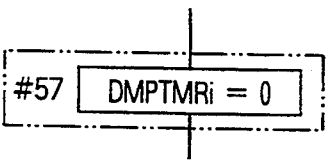
Figure 13C:
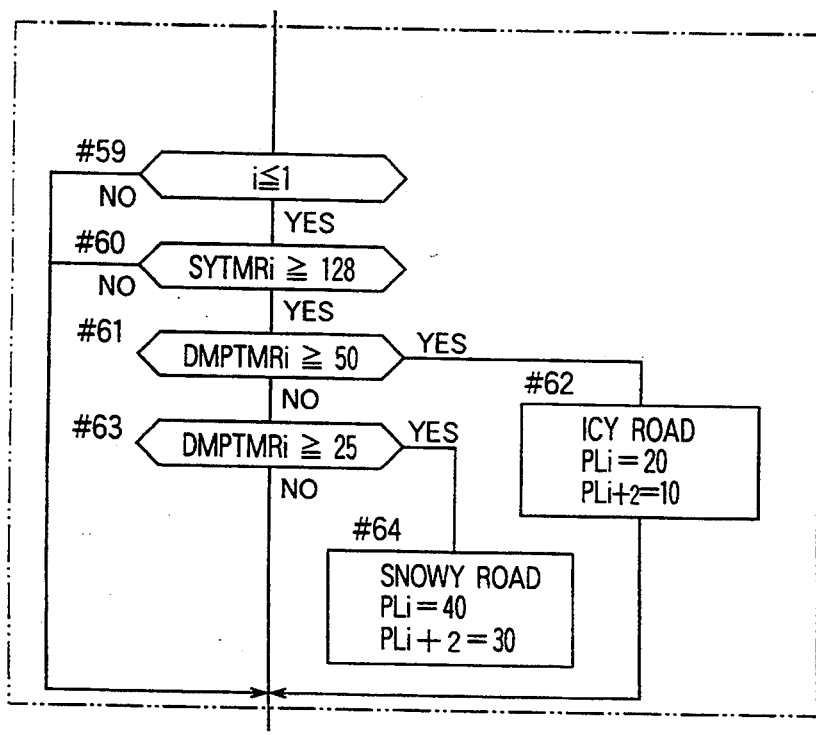

If the synchronization flag $SYFLG_i$ is "1" (i.e., a synchronization state did not exist during the preceding control cycle) at step #11 in FIG. 6, the asynchronization timer $DMPTMR_i$ is incremented by one in step #56 (FIG. 13). If, however, the synchronization flag $SYFLG_i$ is "0" (i.e., a synchronization state did exist) at step #11 in FIG. 6, the asynchronization timer $DMPTMR_i$ is cleared in step #57 (FIG. 13).

Then at step #59 it is determined whether a front or rear wheel is being processed by evaluating the value of i. If i=2 or 3, a rear wheel is being processed and the procedure advances directly to step #21.

If i=0 or 1, however, a front wheel is being evaluated. Then, in step #60, the detection whether it is in the initial skidding, or not, is checked. When this test is true, the procedure advances to step #61.

The asynchronization timer $DMPTMR_i$ is checked at step #61 if a value is greater than 50 (equal to 0.4 sec.). If $DMPTMR_i \geq 50$, the road is determined to be an icy road (or the equivalent friction coefficient) at step #62, the front wheel cylinder pressure $PL_i$ (i=0 or 1) is set to 20 (bar), and the wheel cylinder pressure $PL_i+2$ of the same-side rear wheel is set to 10 (bar).

If $DMPTMR_i < 50$ (step #61), the asynchronization timer $DMPTMR_i$ is checked at step #63 for a value $\geq 25$ (equal to 0.2 sec.). If $DMPTMR_i \geq 25$, the road is determined to be a snowy road (or the equivalent friction coefficient) at step #64, the front wheel cylinder pressure $PL_i$ (i=0 or 1) is set to 40 (bar), and the wheel cylinder pressure $PL_i+2$ of the same-side rear wheel is set to 30 (bar).

In this third embodiment, therefore, the target pressure setting means $PCAL_0$–$PCAL_3$ set the wheel cylinder pressure $PL_i$ at the first locking symptoms detection edge after the start of antilock brake control to a pressure equivalent to the pressure when locking symptoms start on a high friction coefficient road surface, and set the wheel cylinder pressure at all following locking symptoms detection edges to the current target pressure $PT_i$, thereby adjusting the wheel cylinder pressure according to the duration of the asynchronization time.

In this third embodiment, for example, the wheel cylinder pressure $PL_i$ at t=a (FIG. 10) is set to 100 (bar) for $PL_0$ and $PL_1$, and to 60 (bar) for $PL_2$ and $PL_3$. If the asynchronization time as measured by the asynchronization timer $DMPTMR_i$ (the period from t=a−d) is greater than 0.2 sec, the front wheel cylinder pressure $PL_i$ (i=0 or 1) is reduced to 40 (bar) and the same-side rear wheel cylinder pressure $PL_i+2$ is reduced to 30 (bar) as indicated by the dotted line at the moment the initial skid time lasts 0.2 sec.

When skidding continues and the asynchronization timer $DMPTMR_i$ is greater than 0.4 sec. (shown in FIG. 10), the front wheel cylinder pressure $PL_i$ and the same-side rear wheel cylinder pressure $PL_i+2$ are then reset to 20 and 10 (bar), respectively.

In this third embodiment, therefore, the wheel cylinder pressure at the first locking symptoms detection edge is set to a value corresponding to a high friction coefficient road surface without using any pressure detection means, and the wheel cylinder pressure $PL_i$ at the first locking symptoms detection edge is dynamically adjusted according to the time between the first locking symptoms detection edge and restoration of a asynchronization state between the corresponding wheel speed $SPEED_i$ and the estimated vehicle speed VREF. As a result, the target pressure $PT_i$ can be controlled to converge more quickly to the actual wheel cylinder pressure. It is to be noted that the wheel cylinder pressure $PL_i$ can be dynamically adjusted according to the time between the first locking symptoms detection edge and the time when the control request $REQ_i$ is set to "decrease".

The fourth embodiment of the invention is described below with reference to FIG. 14.

The lines and configuration of the fourth embodiment are identical to those of the first embodiment described above except for the elimination of the fluid pressure detection means $PS_0$–$PS_3$ shown in FIG. 1.

With this fourth embodiment as with the first through third embodiments described above, the first steps are to calculate each wheel speed $SPEED_i$ (step #1) and the estimated vehicle speed VREF (step #2). The third step in the fourth embodiment, however, is to evaluate the synchronization state and check for any wheel locking symptoms or recovery therefrom. When it is detected that the detected locking symptoms detection edge to be the first locking symptoms detection edge, the wheel cylinder pressure $PL_i$ at the locking symptoms detection edge is therefore set to the pressure corresponding to the locking symptoms start pressure on a high friction coefficient road surface.

The next step (#70) is to determine whether the locking symptoms detected in step #3 are the first locking symptoms detection edge. Specifically, if $SYTM-R_i \geq 128$, the duration of the synchronization state is determined to be long enough. This is the same test used in the second embodiment.

During the first skid period, the pressurization signal setting means $OUT_0-OUT_3$ set the pressurization signal $S_i$ from the wheel and vehicle behavior calculated by the wheel and vehicle behavior calculation means CAL (step #71).

Figure 14:
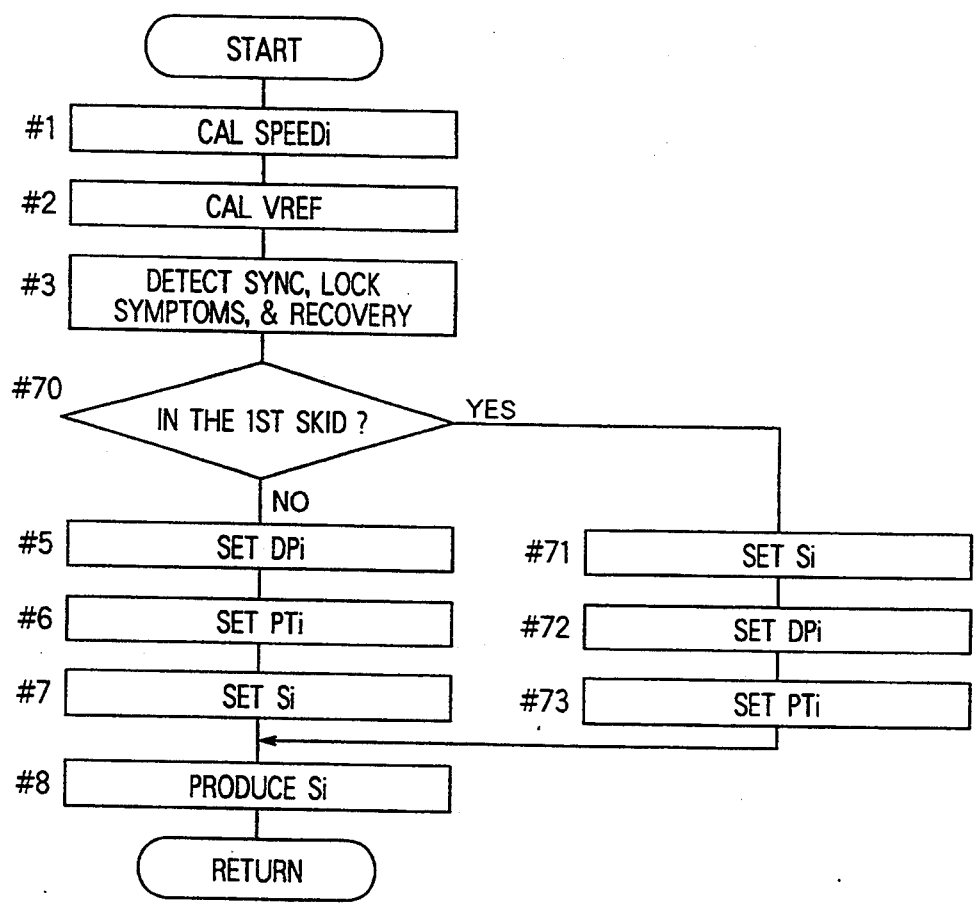
FIG. 14 is a flow chart used to describe the operation of the fourth embodiment.
Figure 15:
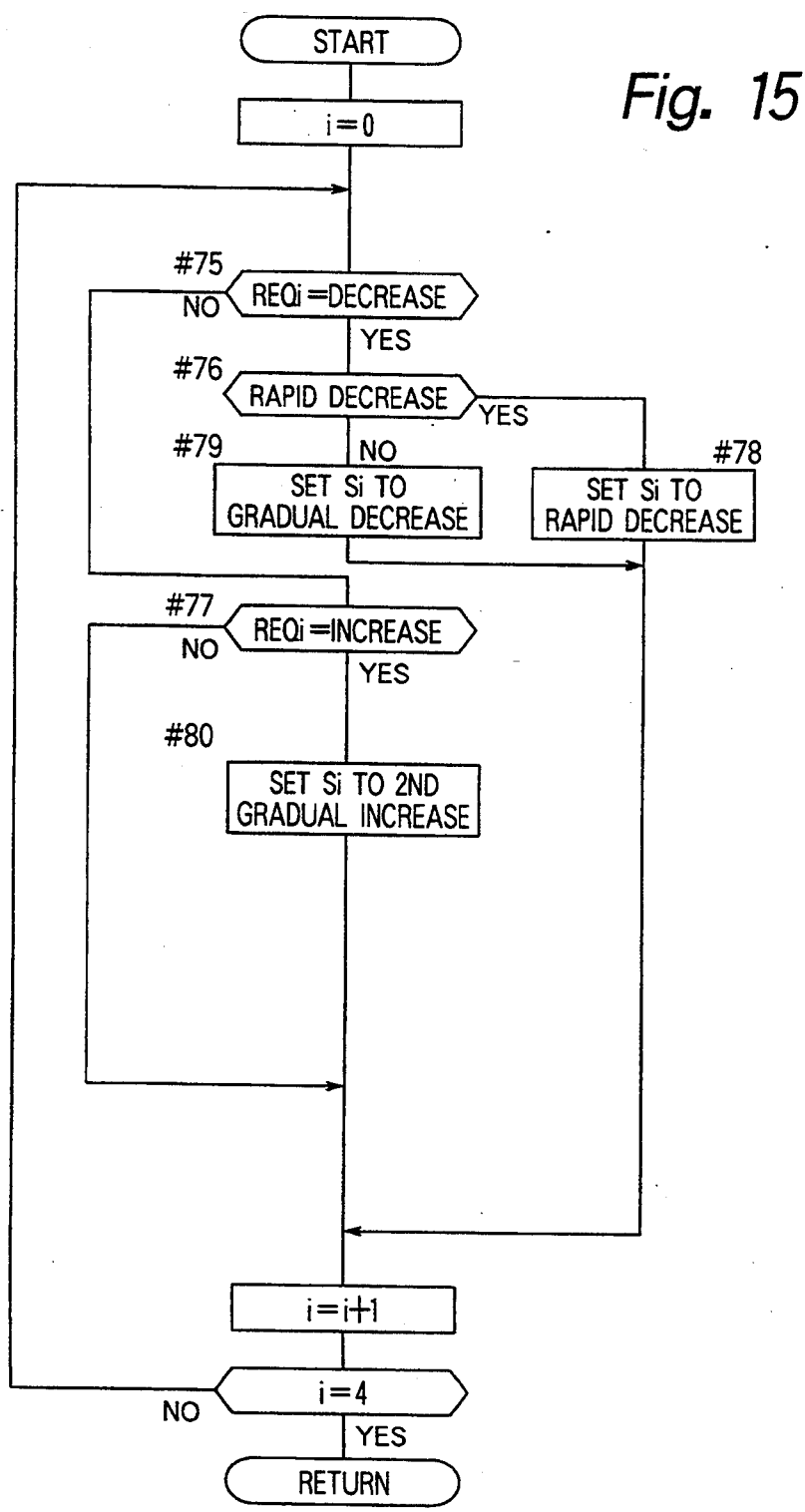
FIG. 15 is a flow chart of step #71 in FIG. 14.

The procedure executed in FIG. 14 step #71 is shown in FIG. 15.

The control request $REQ_i$ is checked at step #75 (FIG. 15). If $REQ_i=$"decrease," step #76 is executed; otherwise, step #77 is evaluated.

At step #76 the conditions requiring "rapid decrease" are evaluated based on equations [4] and [5]. If rapid decrease is required, step #78 is executed; otherwise, step #79 is executed.

At step #78 the pressurization signal $S_i$ is set to "rapid decrease." When rapid decrease is required, the pressurization signal $S_i$ is set to continuously reduce the pressure at each control cycle. Specifically, the pressurization signal $S_i$ causes the increase of brake pressure where the dump time $t_{dump}$ is equal to the control cycle time $\Delta T$, and the apply time $t_{apply}$ and hold time $t_{hold}$ are both 0.

At step #79, the pressurization signal $S_i$ is set to "gradual decrease." In this case the pressurization signal $S_i$ causes, for example, dump and hold to be alternately applied at each control cycle. Specifically, the pressurization signal $S_i$ is set so that decrease where the dump time $t_{dump}$ is equal to the control cycle time $\Delta T$ and the hold where the hold time $t_{apply}$ is equal to the control cycle time $\Delta T$ are alternated each control cycle.

If step #75 returns NO, the control request $REQ_i$ is checked at step #77 for $REQ_i=$"increase." If $REQ_i$ is increase, step #80 is evaluated.

At step #80 the pressurization signal $S_i$ is set to the "second gradual increase."

In this fourth embodiment, therefore, the pressurization signal $S_i$ is set to a rapid decrease, gradual decrease, or a second gradual increase level, and in each case the wheel cylinder pressure is increased, decreased, or held constant for a period equal to the control cycle time $\Delta T$ at each control cycle.

Once the pressurization signal $S_i$ is thus set, the target pressure setting means $PCAL_0-PCAL_3$ calculate the pressurization command width $DP_i$ from the pressurization signal $S_i$ at each control cycle (step #72).

When the current control cycle is a dump cycle, the pressurization command width $DP_i$ is calculated from the target pressure $PT_i$ using equation [18].

$$DP_i = -PT_i \cdot a \qquad [18]$$

where a is a variable determined according to the vehicle and brake characteristics for any given target pressure $PT_i$.

When the current control cycle is a apply cycle, the pressurization command width $DP_i$ is set to a constant A (bar) irrespective of the target pressure $PT_i$.

When the current control cycle is a hold cycle, the pressurization command width $DP_i$ is set to 0.

After thus setting the pressurization command width $DP_i$ from the pressurization signal $S_i$ and target pressure $PT_i$, the target pressure setting means $PCAL_0-PCAL_3$ calculate the integrated value $IDP_i$ of the pressurization command width $DP_i$ and the target pressure $PT_i$ using equations [11] and [12] (step #73).

The pressurization signal $S_i$ set in step #71 is then output to the actuators $ACT_0-ACT_3$ in step #8.

If, however, it is not determined in step #70 that this is the first skid, the pressurization command width $DP_i$, target pressure $PT_i$, and pressurization signal $S_i$ are set in steps #5, #6, and #7, respectively, as in the third embodiment, and the pressurization signal $S_i$ is then output to the actuators $ACT_0-ACT_3$ in step #8.

In this fourth embodiment, therefore, the pressurization signal $S_i$ is set according to the wheel and vehicle behavior, and the pressurization command width $DP_i$ and target pressure $PT_i$ are set according to the pressurization signal $S_i$, during the period from the first locking symptoms detection edge after the start of antilock brake control until synchronization of the wheel speed $SPEED_i$ and estimated vehicle speed VREF is restored.

In the embodiment shown in FIG. 14, steps #71–#73 may be carried out only during the pressure decrease period in the first skid period.

At the second and subsequent locking symptoms detection edges, the current target pressure $PT_i$ is used as the wheel cylinder pressure $PL_i$ at locking symptoms detection, and the pressurization command width $DP_i$, target pressure $PT_i$, and pressurization signal $S_i$ are sequentially set as in the first to third embodiments above.

It is to be noted that the pressurization signal $S_i$ can be directly obtained from the wheel and vehicle behavior during the time between the first locking symptoms detection edge and the time when the control request $REQ_i$ is set to "decrease".

Figure 16:
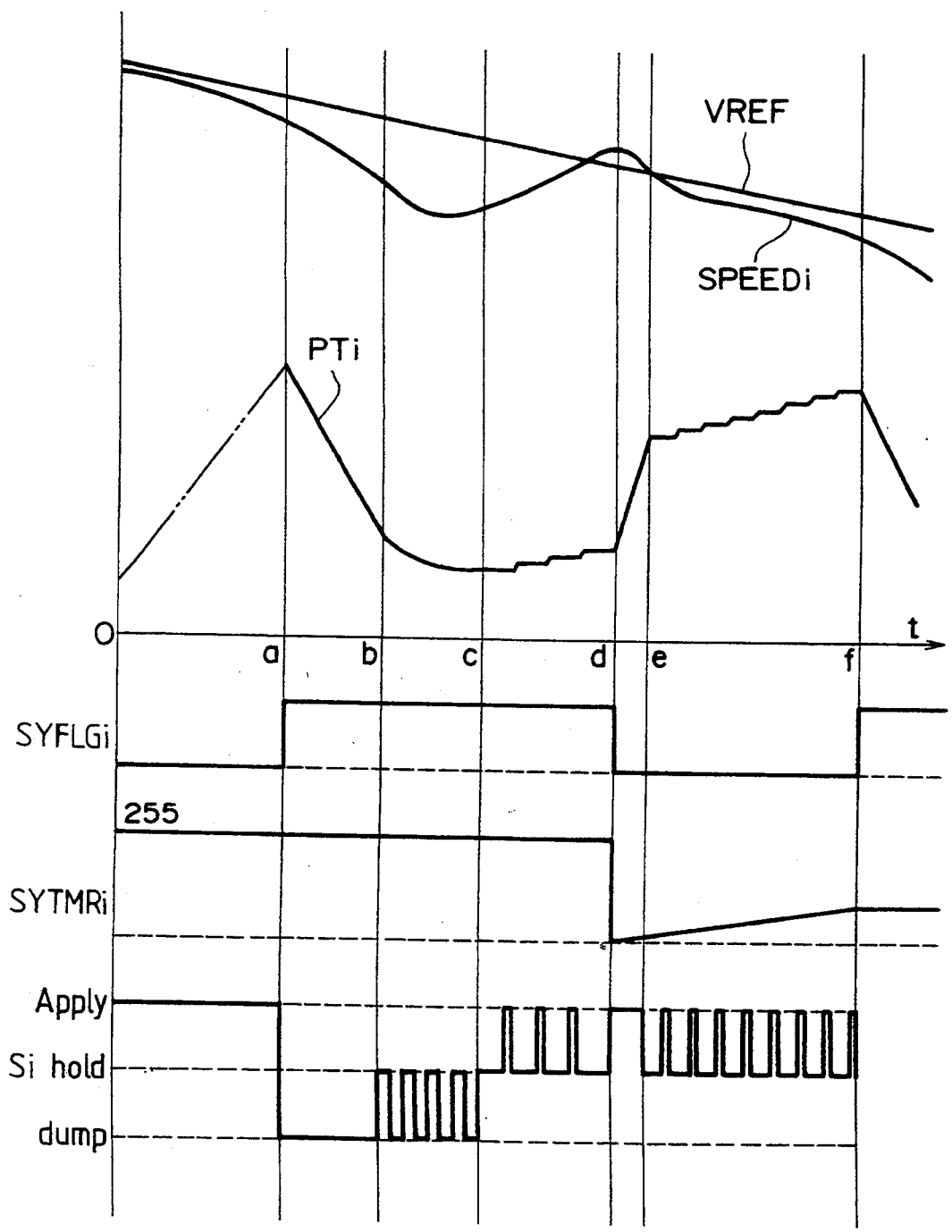
FIG. 16 is a graph of the control process according to the fourth embodiment of the invention.

FIG. 16 is a graph of the antilock brake control sequence according to the fourth embodiment.

Referring to FIG. 16, time t=a corresponds to the first locking symptoms detection edge after the start of antilock brake control. The wheel cylinder pressure $PL_i$ at this time is set to the pressure when locking symptoms start on a high friction coefficient road surface. The synchronization flag $SYFLG_i$ is also set to "1".

Between t=a−b, the control request $REQ_i$ is "decrease" and the pressurization signal $S_i$ is set to rapid decrease.

Between t=b−c, the control request $REQ_i$ is "decrease" and the pressurization signal $S_i$ is set to gradual decrease.

Between t=c−d, the control request $REQ_i$ is "increase" but a synchronization state does not exist. The pressurization signal $S_i$ is therefore set to the second gradual increase level.

At t=d, synchronization of wheel speed $SPEED_i$ and estimated vehicle speed VREF is restored.

Between t=d−e, the pressurization command width $DP_i$ is set to the rapid increase.

Between t=e−f, the pressurization command width $DP_i$ is set to the first gradual increase level.

At t=f if locking symptoms are again detected, the pressurization command width $DP_i$, target pressure $PT_i$, and pressurization signal $S_i$ are sequentially set as in the first embodiment above.

During initial skidding with the fourth embodiment, therefore, the pressurization signal setting means $OUT_0$-$OUT_3$ define the pressurization signals based on the wheel and vehicle behavior, drive the actuators $ACT_0$-$ACT_3$ based on the set pressurization signals, and the target pressure setting means $PCAL_0$-$PCAL_3$ also calculate the pressurization command width $DP_i$ from the pressurization signal $S_i$ to set the target pressure $PT_i$. As a result, even when the pressure that is set as the wheel cylinder pressure $PL_i$ at the first locking symptoms detection edge after the start of antilock brake control (i.e., the pressure when locking symptoms start on a high friction coefficient road surface) is significantly different from the wheel cylinder pressure when locking symptoms occur on the real road surface, the target pressure $PT_i$ can be made to quickly converge on the actual pressure $PR_i$.

In addition, the pressurization command width $DP_i$ is set from the wheel and vehicle behavior, and the actuators $ACT_0$-$ACT_3$ are controlled by the pressurization signal $S_i$ set according to the pressurization command width $DP_i$ at the second and subsequent skidding occurrences in the fourth embodiment. As a result, the effects of pulsation can be prevented, and high precision control of the wheel cylinder pressure can be achieved.

The fifth embodiment of the invention is described below with reference to FIG. 17.

The lines and configuration of the fifth embodiment are identical to those of the first embodiment described above except for the elimination of the fluid pressure detection means $PS_0$-$PS_3$ shown in FIG. 1.

This fifth embodiment is characterized by controlling gradual increase of only the front wheel on the high friction coefficient road surface side of the vehicle when the vehicle is travelling with the right and left sides on surfaces having different coefficients of friction. Such a road surface is referred to below as a "split road surface," and this control method as "split control."

Figure 17:
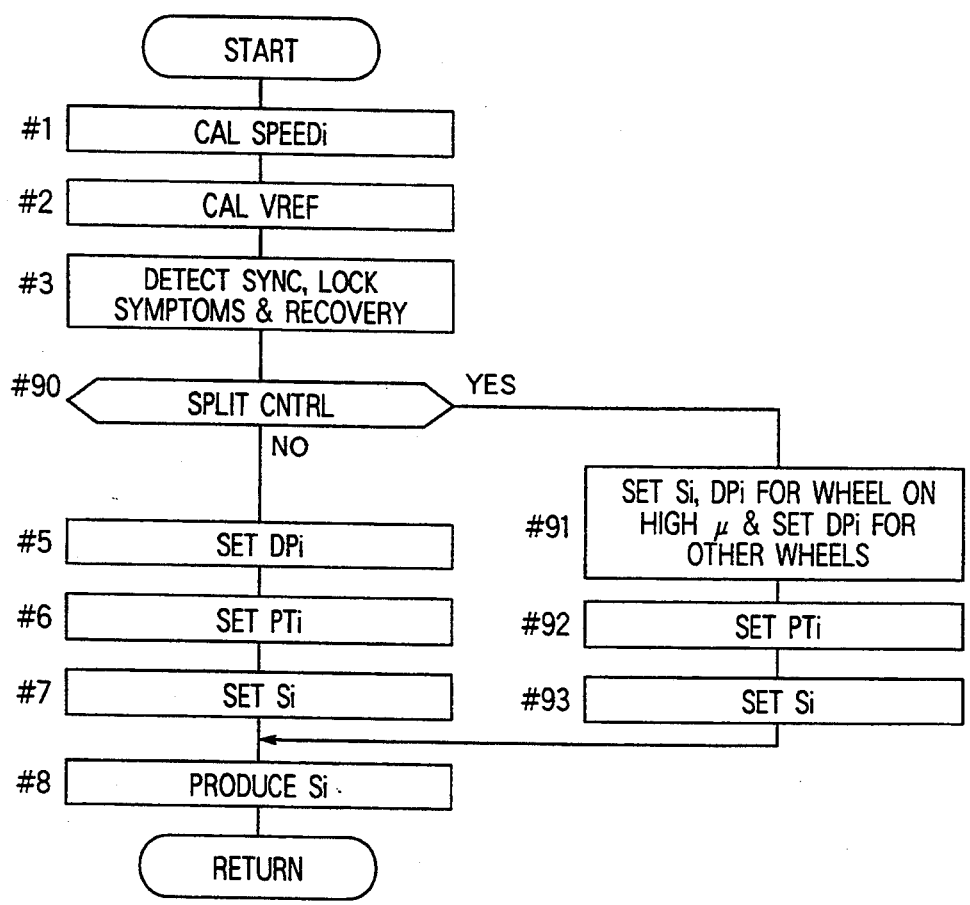
FIG. 17 is a flow chart used to describe the operation of the fifth embodiment.

As shown in FIG. 17, the first steps in the control process of the fifth embodiment are to calculate each wheel speed $SPEED_i$ (step #1), the estimated vehicle speed VREF (step #2), and in step #3 to evaluate the synchronization state and check for any wheel locking symptoms or recovery therefrom based on the wheel and vehicle behavior expressed by the $SPEED_i$ and VREF values.

Whether split control is necessary is then determined at step #90.

As described above, split control is necessary when the friction coefficients of the road surfaces on the right and left sides of the vehicle are significantly different. This evaluation is made in this embodiment by measuring the amount of slipping by the right and left side wheels. If one side is slipping significantly more than the other, then the friction coefficients are determined to be significantly different and split control to be necessary. Specifically, for example, the left and right front wheel speeds SPEED0 and SPEED1 are applied in equation [19] to determine the split control need.

$$|SPEED0 - SPEED1| \geq 10 \qquad [19]$$

It is to be noted that the determination of split control need is not limited to the test in equation [19]. It is also possible to provide sensors to measure the friction coefficient of the road surface on right and left sides, obtain the difference between the measured friction coefficients, and apply split control when the difference between the measured friction coefficients becomes very high. Alternatively, the split control can be applied when the decrease time between the right and left wheels becomes very large.

If split control is determined necessary at step #90, step #91 is executed to set the pressurization signal $S_i$ of the front wheel on the high friction coefficient road surface side from the wheel and vehicle behavior and the pressurization command width $DP_i$ of the same wheel based on the selected pressurization signal $S_i$, and then set the pressurization command width $DP_i$ of the other wheels (i.e., the front wheel on the low friction coefficient road surface and the two rear wheels) based on the wheel and vehicle behavior. This process is shown in FIG. 18.

Figure 18:
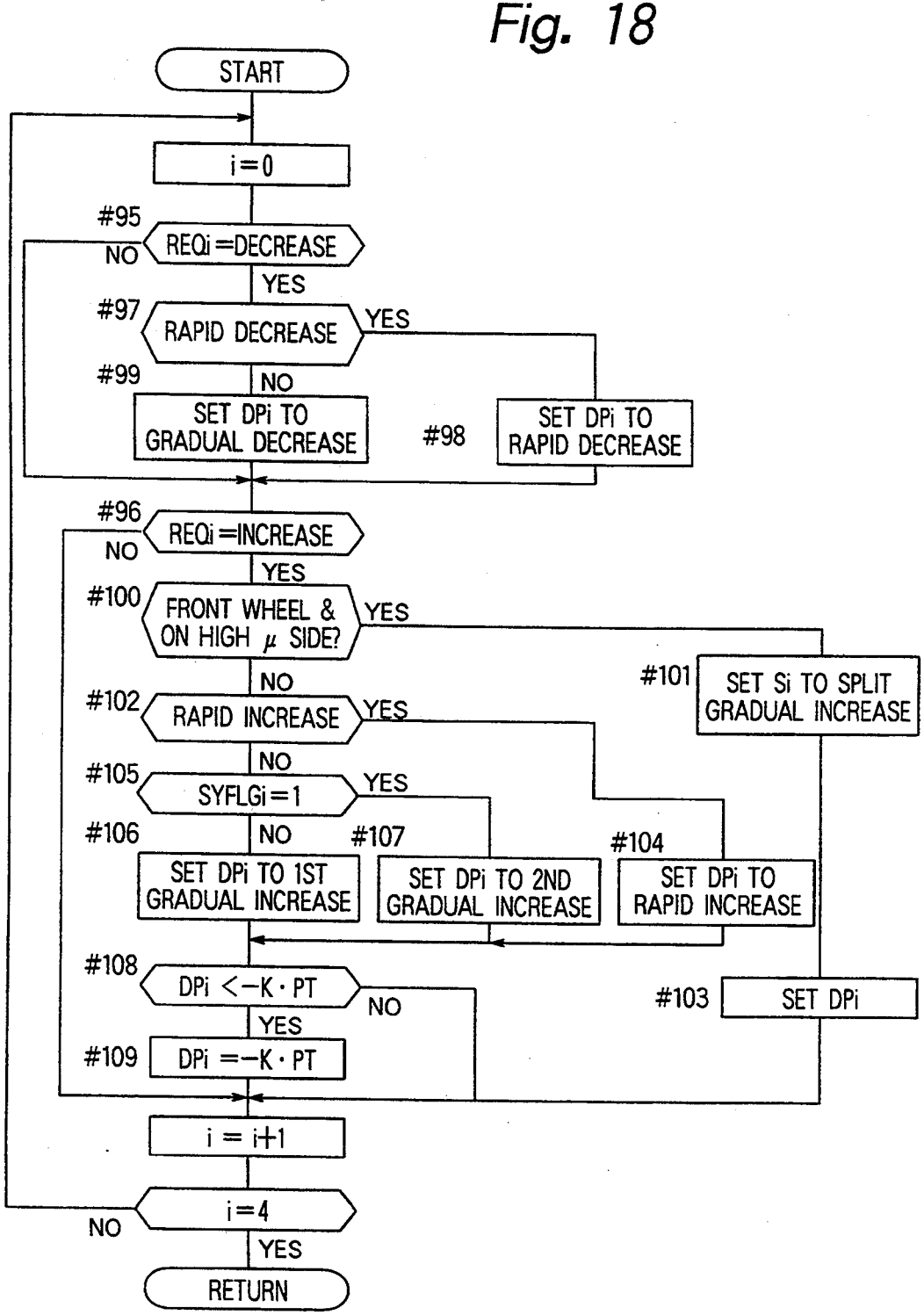
FIG. 18 is a flow chart of step #91 in FIG. 17.

The control request $REQ_i$ is checked at step #95 (FIG. 18). If $REQ_i$="decrease," step #97 is executed; otherwise, step #96 is evaluated.

At step #97 the conditions requiring "rapid decrease" are evaluated based on equations [4] and [5]. If rapid decrease is required, the pressurization command width $DP_i$ is set to rapid decrease at step #98; otherwise, the pressurization command width $DP_i$ is set to gradual decrease at step #99.

Note that the specific processes used in steps #97, #98, and #99 are the same as those executed in steps #27, #28, and #29 in the first embodiment above.

If step #95 returns NO, the control request $REQ_i$ is checked for $REQ_i$="increase" in step #96. If $REQ_i$="increase," step #100 is evaluated.

In step #100, it is determined whether the current wheel being processed is a front wheel on a high friction coefficient road surface. If it is, step #101 is executed; otherwise, step #102 is evaluated.

At step #101 the pressurization signal $S_i$ is set to "split gradual increase."

In "split gradual increase," the pressurization signal $S_i$ holds the hold time $t_{hold}$ equal to the control cycle time $\Delta T$ for, e.g., 19 consecutive control cycles, and sets the apply time $t_{apply}$ equal to the control cycle time $\Delta T$ for increase of brake pressure during the one following (the twentieth) control cycle. In other words, the pressurization signal $S_i$ is set so that the wheel cylinder pressure is applied for only one of every twenty control cycles during the split gradual increase, and is held constant for the other 19 control cycles.

The pressurization command width $DP_i$ is set in step #103 at each control cycle. Similarly to the fourth embodiment, when the pressurization signal $S_i$ is set to "split gradual increase" in the fifth embodiment, either pressurization or pressure hold is maintained throughout the control cycle time $\Delta T$ for each control cycle. Thus, the pressurization command width $DP_i$ is set to a constant value A (bar) irrespective of the target pressure $PT_i$ during a pressurization control cycle, and to 0 during a hold control cycle.

The conditions requiring rapid increase are evaluated at step #102. If the conditions are met, the pressurization command width $DP_i$ is set to rapid increase at step #104, otherwise the synchronization flag $SYFLG_i (=1)$ is checked at step #105.

The pressurization command width $DP_i$ is set for "first gradual increase" at step #106 if the synchronization flag $SYFLG_i$ does not equal "1" (a synchronization state exists) in step #105. It is otherwise set to for "second gradual increase" at step #107.

It is to be noted that steps #102 to #107 above are the same as the corresponding steps (#30–#34) in the first embodiment. Steps #108 and #109 also correspond to steps #35 and #36 in the first embodiment, i.e., if the pressurization command width $DP_i$ is less than a predetermined value, the pressurization command width $DP_i$ is reset to equal that predetermined value.

The target pressure $PT_i$ is then calculated from equation [12] at step #92. At step #93 the pressurization signal $S_i$ is set as in the first embodiment for all wheels other than the one front wheel on the high friction coefficient road surface for which the pressurization signal $S_i$ was already set in step #91. The pressurization signals $S_i$ are then output to the actuators $ACT_0$–$ACT_3$ in step #8.

If, however, it is determined in step #90 that split control is not necessary, the pressurization command width $DP_i$, target pressure $PT_i$, and pressurization signal $S_i$ values are set in steps #5–#7 as in the first embodiment.

As thus described, the fifth embodiment evaluates whether the front wheel is on a high friction coefficient road surface (step #90) only when the control request $REQ_i$ is set to "increase." For example, when the left side of the vehicle is on a low friction coefficient road surface (e.g., there is ice on the road on that side of the vehicle) and the right side of the vehicle is on a high friction coefficient road surface (e.g., the asphalt is dry on that side), locking symptoms will first be detected in the left side wheels (i=0, 2) where the friction coefficient is low. As a result, the wheel speeds SPEED1 and SPEED3 for the right side (high friction coefficient side) will be synchronized with the estimated vehicle speed VREF, and the control request REQ1 for the right front wheel will always be set to "increase."

Figure 19:
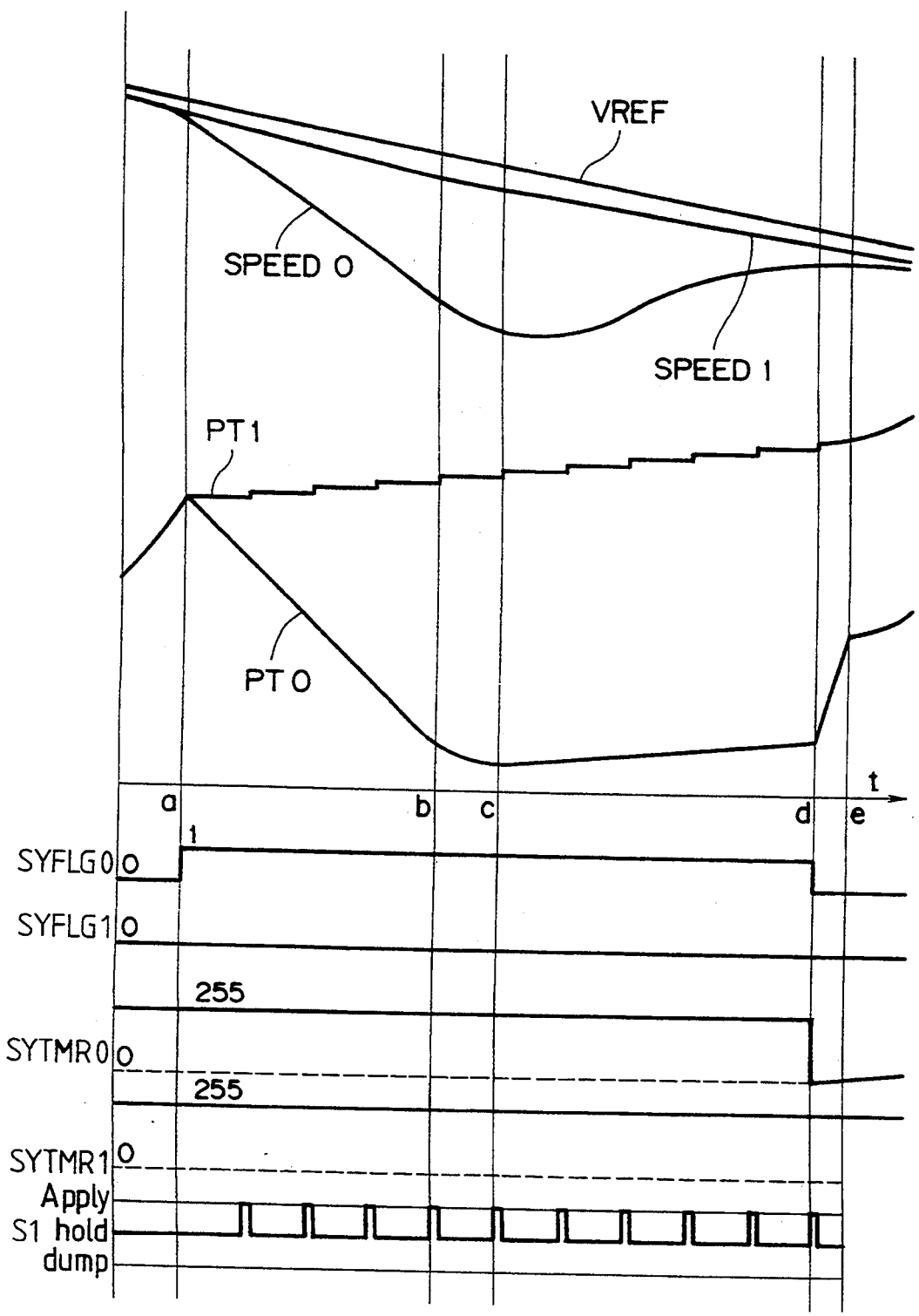
FIG. 19 is a graph of the control process according to the fifth embodiment of the invention.

A specific example of this operation is described below with reference to FIG. 19.

It is assumed in this graph that the left side of the vehicle is on a low friction coefficient road surface, e.g., ice or snow, and the right side is on a high friction coefficient surface, e.g., dry asphalt.

Time t=a corresponds to the first locking symptoms detection edge for the left front wheel (i=0). Between t =a−b, the control request REQ0 for the left front wheel is "decrease," and the pressurization signal $S_0$ is "rapid decrease." At the same time, the high friction coefficient side (right) front wheel (i=1) does not indicate any locking symptoms, and the pressurization signal $S_1$ is thus set to "split gradual increase."

At t=b−c, the control request REQ0 for the left front wheel is "decrease," and the pressurization signal $S_0$ is "gradual decrease." Split gradual increase of the right front wheel continues.

At t=c−d, the control request REQ0 for the left front wheel is "increase," and the pressurization signal $S_0$ is "gradual increase." Split gradual increase of the right front wheel still continues.

At t=d when recovery from the locking symptoms is detected in the left front wheel, the pressurization signal $S_1$ of the right front wheel P1 is set to gradual increase. Between t=d−e, the pressurization signal $S_0$ for the left front wheel is set to rapid increase, and is set to first gradual increase after t=e.

Thus, when there is a significant difference between the road surface friction coefficients on right and left sides of the vehicle, split control in which the front wheel on the high friction coefficient side is regulated to gradual increase. As a result, the effects of pressure pulsations are reduced and good control of the wheel cylinder pressure is maintained. In addition, good braking performance can be obtained and both vehicle stability and steering control can be sustained on split road surfaces because the drive wheel on the high friction coefficient side for which locking symptoms are not detected is regulated to gradual pressurization.

It is to be noted that the present invention shall not be limited to the embodiments described above, and other variations are possible.

For example, in the first through fifth embodiments, the actuators $ACT_0$–$ACT_3$ use on/off solenoid valves as the inlet valves 3A–3D and outlet valves 4A–4D to regulate the fluid pressure in the wheel cylinders 2A–2D by means of three position control: pressurize, depressurize, and hold. It is possible, however, to use mechanical valves for the inlet valves 3A', 3B', 3C', and 3D' (FIG. 20) while using on/off solenoid valves as the outlet valves 4A–4D.

When mechanical inlet valves 3A'–3D' are used, there are two operating fluid pressures, the inlet pressure PV1 and the outlet pressure PV2, with a spring 12 working in the same direction as the inlet pressure PV1.

Figure 20:
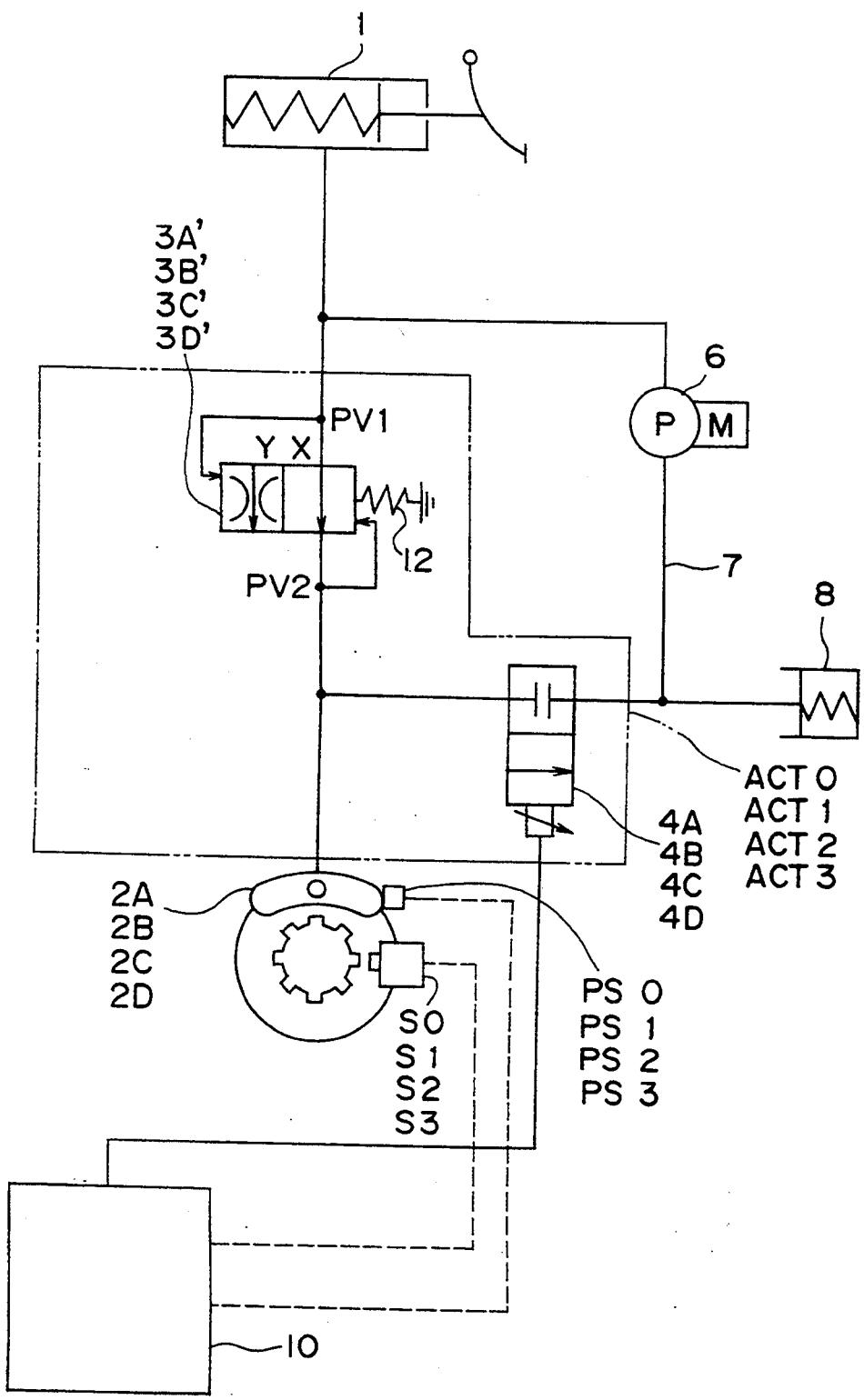
FIG. 20 is a block diagram of an alternative embodiment of the invention.

These mechanical inlet valves 3A'–3D' are normally at position X in FIG. 20, but when the inlet pressure PV1 exceeds the outlet pressure PV2, and the differential pressure exceeds the spring 12 strength, the valve moves to position Y and the fluid pressure in wheel cylinder 1 is transmitted through the orifice to the wheel cylinder 2 side.

When these mechanical inlet valves 3A'–3D' are used, two position control results.

Specifically, when the on/off solenoid outlet valves 4A–4D are opened, a dump state results. An apply state results when the valves are closed. There is no hold state. As a result, the speed of the decrease and increase cycles can only be regulated by controlling the opening and closing time of the outlet valves 4A–4D in the device shown in FIG. 20.

Furthermore, the invention shall not be limited to the equations [1]–[20] used for the operation of the first through fifth embodiments above, and the equations may be modified to accommodate other various conditions.

As described hereinabove, the antilock brake control apparatus according to the present invention does not use a closed-loop control process due to the fluid pressure behavior and characteristics of on/off valves. By using an open-loop control process, the effects of pressure pulsations accompanying on/off valve operation can be reduced, and the wheel cylinder pressure can be controlled with high precision.

Furthermore, when the wheel cylinder pressure is set to a pressure level corresponding to a high friction coefficient road surface at the first detected skid without using a pressure detection means in the antilock brake control apparatus of the invention, the cost of the antilock brake control apparatus can be reduced because the pressure detection means can be eliminated.

Moreover, the target pressure can be quickly converged to the real wheel cylinder pressure by setting the wheel cylinder pressure at the first locking symptoms detection edge to the pressure when locking symptoms start on a high friction coefficient road surface, and setting the wheel cylinder pressure at the first locking symptoms detection edges according to the time from detection of the first locking symptoms until the wheel speed and estimated vehicle speed are again synchronized, or according to the time from the first locking symptoms detection edge until a time when the pressure decrease detection is acquired.

In addition, when the wheel cylinder pressure at the first locking symptoms detection edge is set to the pressure when locking symptoms start on a high friction coefficient road surface, and the pressurization signal is set based on the wheel and vehicle behavior, the target pressure can be made to quickly converge on the actual pressure even when the difference between the real pressure and the pressure that is set as the wheel cylinder pressure at the first locking symptoms detection edge is great. As a result, the time from detection of the first locking symptoms until the wheel speed and estimated vehicle speed are again synchronized, or the time from the first locking symptoms detection edge until a time when the pressure decrease detection is acquired, is shortened.

When a split road surface is detected, it is still possible to reduce the effects of wheel cylinder pressure pulsations. When locking symptoms are detected on a split road surface, it is also possible to maintain good braking performance, vehicle stability, and good steering control by using gradual pressurization for the wheels on the high friction coefficient side.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An antilock brake control apparatus for adjusting a wheel cylinder pressure of each wheel of a vehicle, said antilock brake control apparatus comprising:
    a wheel speed detection means for detecting the speed of each wheel;
    a wheel and vehicle behavior calculation means for calculating the vehicle and wheel behavior, including at least an estimated vehicle speed, based on the speed of each wheel detected by said wheel speed detection means;
    a locking symptoms detection means for detecting wheel locking symptoms and recovery from wheel locking symptoms based on the wheel and vehicle behavior calculated by said wheel and vehicle behavior calculation means;
    a target pressure setting means for setting a target pressure, which is the estimated value of the wheel cylinder pressure during antilock brake control, based on the wheel cylinder pressure at a locking symptoms detection edge;
    a pressurization signal setting means for setting a pressurization signal based on the target pressure; and
    actuator means for adjusting the wheel cylinder pressure of each wheel in accordance with the pressurization signal set by said pressurization signal setting means;
    said target pressure setting means setting a brake pressurization command width, which corresponds to the magnitude of an increase or decrease in the wheel cylinder pressure, at each control cycle based on the wheel and vehicle behavior calculated by said wheel and vehicle behavior calculation means, calculating an integrated value of the pressurization command width at each control cycle, and setting the target pressure, at each control cycle, to the sum of the wheel cylinder pressure at the locking symptoms detection edge and the integrated value of the pressurization command width.

2. An antilock brake control apparatus according to claim 1, said pressurization signal setting means setting the pressurization signal based on the target pressure and the pressurization command width.

3. An antilock brake control apparatus according to claim 1, further comprising a fluid pressure detection means for detecting the fluid pressure of each wheel cylinder, and wherein the target pressure setting means sets the wheel cylinder pressure at the locking symptoms detection edge as the pressure detected by the fluid pressure detection means.

4. An antilock brake control apparatus according to claim 1, wherein said actuator means comprises inlet and outlet valves and means for opening and closing the valves, in accordance with the pressurization signal, to increase and decrease the wheel cylinder pressure of each wheel.

5. An antilock brake control apparatus according to claim 4, wherein said pressurization signal setting means comprises means for setting a dump time $t_{dump}$, which is a period during which the outlet valves of said actuator means are open and the inlet valves of said actuator means are closed, according to the following:

$$t_{dump} = -DP_i(L / PT_i)$$

where $DP_i$ is the pressurization command width, L is a constant determined by the characteristics of the wheel cylinder, $PT_i$ is the target pressure, and i indicates each of the wheels.

6. An antilock brake control apparatus according to claim 5, wherein said pressurization signal setting means further comprises means for setting a hold time $t_{hold}$, which is a period during which the outlet and inlet values of said actuator means are closed, according to the following:

$$t_{hold} = \Delta T - t_{dump}$$

where $\Delta T$ is the control cycle.

7. An antilock brake control apparatus according to claim 6, wherein said pressurization signal setting means further comprises means for setting a pressure apply time $t_{apply}$, which is a period during which the inlet valves of said actuator means are opened and the outlet valves of said actuator means are closed, according to the following:

$$t_{apply} = \Delta T(\Delta P / DPi - 1)$$

where $\Delta P$ is a pressure decrease width that is proportional to the target pressure $DPi$ based on the depressurization characteristics of the inlet and outlet valves for a given dump time $t_{dump}$.

8. An antilock brake control apparatus according to claim 7, wherein in a pressure increase state, the inlet valves are opened and closed, according to the pressure apply time $t_{apply}$ and hold time $t_{hold}$, and the outlet valves are closed.

9. An antilock brake control apparatus according to claim 7, wherein a pressure decrease state, the outlet valves are opened and closed, according to the dump time $t_{dump}$ and hold time $t_{hold}$, and the inlet valves are closed.

10. An antilock brake control apparatus for adjusting a wheel cylinder pressure of each wheel of a vehicle, said antilock brake control apparatus comprising:

means for detecting the wheel speed of each wheel;

means for calculating the vehicle and wheel behavior, including at least an estimated vehicle speed, based on the speed of each wheel detected by said wheel speed detection means;

means for detecting wheel locking symptoms and recovery from wheel locking symptoms based on the wheel and vehicle behavior calculated by said wheel and vehicle behavior calculation means;

means for setting a target pressure, which is the estimated value of the wheel cylinder pressure during antilock brake control, based on the wheel cylinder at a locking symptoms detection edge;

means for setting a pressurization signal; and actuator means for adjusting the wheel cylinder pressure of each wheel in accordance with the pressurization signal set by said pressurization signal setting means;

said target pressure setting means setting a pressurization command width at each control cycle based on the pressurization signal set by said pressurization signal setting means, calculating an integrated value of the pressurization command width, and setting the target pressure, at each control cycle, to the sum of the wheel cylinder pressure at the locking symptoms detection edge and the integrated value of the pressurization command width.

11. An antilock brake control apparatus according to claim 10, said target pressure setting means setting the wheel cylinder pressure, at the first locking symptoms detection edge, to a pressure at which locking symptoms occur on a high friction coefficient road surface, and setting the wheel cylinder pressure, at the second and subsequent locking symptoms detection edges, to the target pressure current at that time.

12. An antilock brake control apparatus according to claim 11, wherein the target pressure setting means adjusts the wheel cylinder pressure at the first locking symptoms detection edge according to the time from the first locking symptoms detection edge until the wheel speed and vehicle speed are again synchronized.

13. An antilock brake control apparatus according to claim 11, wherein the target pressure setting means adjusts the wheel cylinder pressure at the first locking symptoms detection edge according to the time from the first locking symptoms detection edge until a time when the pressure decrease detection is acquired.

14. An antilock brake control apparatus according to claim 11, wherein the target pressure setting means detects a split road surface, which is defined as a road surface where the difference between the friction coefficients on right and left sides is great, and when the vehicle is thus detected to be on a split road surface; the pressurization signal setting means sets the pressurization signal of the drive wheel on the high friction coefficient side to a slow pressurization level for the period from the locking symptoms detection edge until the wheel speed and estimated vehicle speed are again synchronized; and the target pressure setting means sets the pressurization command width from the pressurization signal set by the pressurization signal setting means; calculates the integrated value of the pressurization command width; and defines the target pressure at each control cycle as the sum of the wheel cylinder pressure at the locking symptoms detection edge and the integrated value of the pressurization command width.

15. An antilock brake control apparatus according to claim 11, said pressurization signal setting means setting the pressurization signal based on the wheel and vehicle behavior calculated by said wheel and vehicle behavior calculation means for a period after the start of the first locking symptoms detection edge.

16. An antilock brake control apparatus according to claim 15, wherein the period is defined as a time from the first locking symptoms detection edge until the wheel speed and vehicle speed are synchronized.

17. An antilock brake control apparatus according to claim 15, wherein the period is defined as the time from the first locking symptoms detection edge until a time when the pressure decrease detection is acquired.

18. An antilock brake control apparatus according to claim 10, wherein said actuator means comprises inlet and outlet valves and means for opening and closing the valves, in accordance with the pressurization signal, to increase and decrease the wheel cylinder pressure of each wheel.

19. An antilock brake control apparatus according to claim 18, wherein said pressurization signal setting means comprises means for setting a dump time $t_{dump}$, which is a period during which the outlet valves of said actuator means are open and the inlet valves of said actuator means are closed, according to the following:

$$t_{dump} = -DP_i(L / PT_i)$$

where $DP_i$ is the pressurization command width, L is a constant determined by the characteristics of the wheel cylinder, $PT_i$ is the target pressure, and i indicates each of the wheels.

20. An antilock brake control apparatus according to claim 19, wherein said pressurization signal setting means further comprises means for setting a hold time $t_{hold}$, which is a period during which the outlet and inlet values of said actuator means are closed, according to the following:

$$t_{hold} = \Delta T - t_{dump}$$

where $\Delta T$ is the control cycle.

21. An antilock brake control apparatus according to claim 20, wherein said pressurization signal setting means further comprises means for setting a pressure apply time $t_{apply}$, which is a period during which the inlet valves of said actuator means are opened and the outlet valves of said actuator means are closed, according to the following:

$$t_{apply} = \Delta T(\Delta P / DP_i - 1)$$

where $\Delta P$ is a pressure decrease width that is proportional to the target pressure $DP_i$ based on the depressurization characteristics of the inlet and outlet valves for a given dump time $t_{dump}$.

22. An antilock brake control apparatus according to claim 21, wherein in a pressure increase state, the inlet valves are opened and closed, according to the pressure apply time $t_{apply}$ and hold time $t_{hold}$ and the outlet valves are closed.

23. An antilock brake control apparatus according to claim 22, wherein a pressure decrease state, the outlet valves are opened and closed, according to the dump time $t_{dump}$ and hold time $t_{hold}$, and the inlet valves are closed.

* * * * *